United States Patent
Allgeuer et al.

(10) Patent No.: US 6,872,438 B1
(45) Date of Patent: Mar. 29, 2005

(54) PROFILE OR MOLDING HAVING A FRINGED SURFACE STRUCTURE

(75) Inventors: Thomas T. Allgeuer, Wollerau (CH); Selim Bensason, Houston, TX (US); Pak-Wing S. Chum, Lake Jackson, TX (US); Jacquelyne A. deGroot, Lake Jackson, TX (US); Wenbin Liang, Sugarland, TX (US); Antonio Torres, Midland, MI (US); Werner Wagner, Mallorca-Alcudia (ES)

(73) Assignee: Advanced Design Concept GmbH, Hannover (DE)

(*) Notice: Subject to any disclaimer, the term of this patent is extended or adjusted under 35 U.S.C. 154(b) by 0 days.

(21) Appl. No.: 10/031,302

(22) PCT Filed: Jul. 17, 2000

(86) PCT No.: PCT/US00/19318
§ 371 (c)(1),
(2), (4) Date: Aug. 9, 2002

(87) PCT Pub. No.: WO01/05572

PCT Pub. Date: Jan. 25, 2001

Related U.S. Application Data

(60) Provisional application No. 60/153,793, filed on Mar. 28, 2002, now abandoned, and provisional application No. 60/144,306, filed on Mar. 26, 2002.

(51) Int. Cl.[7] .............................. B32B 3/02; B32B 33/00

(52) U.S. Cl. .............................. 428/92; 428/85; 428/88; 428/97; 428/159; 428/160; 428/172; 428/213; 428/215; 428/220; 264/134; 264/164; 264/243

(58) Field of Search .................................. 264/134, 164, 264/243; 428/85, 913, 97, 88, 159, 160, 213, 215, 220, 172, 400, 91, 92, 93

(56) References Cited

U.S. PATENT DOCUMENTS

| | | |
|---|---|---|
| 3,399,425 A | 9/1968 | Lemelson |
| 3,600,260 A * | 8/1971 | Watanabe .................. 428/85 |

(Continued)

FOREIGN PATENT DOCUMENTS

| | | |
|---|---|---|
| CA | 2324313 | 10/1999 |
| DE | 1964736 | 7/1970 |

(Continued)

*Primary Examiner*—Sandra M. Nolan
*Assistant Examiner*—Patricia L. Nordmeyer
(74) *Attorney, Agent, or Firm*—O'Keefe, Egan & Peterman, LLP

(57) ABSTRACT

Disclosed are mono-layer or multi-layer profiles or moldings wherein at least one layer comprises a fringed surface microstructure, a process for making these items and uses thereof. Further disclosed are articles of manufacture comprising such profile or molding.

21 Claims, 1 Drawing Sheet

U.S. PATENT DOCUMENTS

| | | | | |
|---|---|---|---|---|
| 3,809,734 A | * | 5/1974 | Watanabe | 264/51 |
| 3,814,791 A | | 6/1974 | Jones | 264/164 |
| 3,895,153 A | | 7/1975 | Johnston et al. | 428/141 |
| 3,983,278 A | | 9/1976 | Wardle | 428/92 |
| 3,987,228 A | * | 10/1976 | Hemming | 428/91 |
| 4,174,991 A | * | 11/1979 | Reuben | 156/242 |
| 4,183,889 A | | 1/1980 | Brendel | 264/134 |
| 4,189,336 A | | 2/1980 | Huttlesz | 156/72 |
| 4,257,755 A | | 3/1981 | Lemelson | 425/168 |
| 4,308,649 A | | 1/1982 | Gilpatrick et al. | 26/2 R |
| 4,451,419 A | | 5/1984 | Bye et al. | 264/164 |
| 4,463,045 A | | 7/1984 | Ahr et al. | 428/131 |
| 4,629,643 A | | 12/1986 | Curro et al. | 428/131 |
| 4,927,682 A | * | 5/1990 | Nagura et al. | 428/88 |
| 5,099,553 A | | 3/1992 | Dischler | 26/2 R |
| 5,192,484 A | | 3/1993 | Matuzawa et al. | 264/555 |
| 5,407,735 A | * | 4/1995 | Fukuda et al. | 428/92 |
| 5,505,747 A | | 4/1996 | Chesley et al. | 51/297 |
| 5,518,865 A | | 5/1996 | Hoessel et al. | 430/326 |
| 5,733,628 A | | 3/1998 | Pelkie | 428/138 |
| 5,792,411 A | | 8/1998 | Morris et al. | 264/400 |
| 5,814,413 A | | 9/1998 | Beerwart | 428/516 |
| 5,815,840 A | * | 10/1998 | Hamlin | 2/161.6 |
| 6,312,786 B1 | | 11/2001 | Schwinn | 428/143 |
| 6,511,734 B1 | | 1/2003 | Wagner | 428/152 |

FOREIGN PATENT DOCUMENTS

| | | |
|---|---|---|
| DE | 19524076 | 10/1996 |
| DE | 19605788 | 5/1997 |
| DE | 19731315 | 1/1999 |
| DE | 19812097 | 9/1999 |
| DE | 19843109 | 3/2000 |
| EP | 0089746 | 9/1983 |
| EP | 0275653 | 7/1988 |
| EP | 309073 | 3/1989 |
| EP | 0899086 | 3/1999 |
| GB | 919100 | 2/1963 |
| GB | 1158471 | 7/1969 |
| JP | 01014364 | 1/1989 |
| JP | 03 253341 | 11/1991 |
| WO | WO 96/13979 | 5/1996 |
| WO | WO 97/02128 | 2/1997 |
| WO | WO 99/06623 | 2/1999 |
| WO | WO 99/16608 | 4/1999 |
| WO | WO 99/32272 | 7/1999 |
| WO | WO 99/54106 | 10/1999 |
| WO | WO 99/47339 | 11/1999 |
| WO | WO 00/16965 | 3/2000 |
| WO | WO 00/34562 | 6/2000 |

* cited by examiner

PROFILE OR MOLDING HAVING A FRINGED SURFACE STRUCTURE

This application is a 35 U.S.C. §371 nationalized application of PCT/US00/19318, filed Jul. 17, 2000, which claims priority to U.S. provisional application Ser. No. 60/144,306 filed Mar. 26, 2002 and to U.S. provisional application Ser. No. 60/153,793, filed Mar. 28, 2002, now abandoned, incorporated herein by reference.

FIELD OF THE INVENTION

This invention relates to a surface having a fringed microstructure and to a profile or molding characterized in that it comprises a fringed surface microstructure. The invention also provides a process and a device to make such profile or molding, uses thereof, as well as articles of manufacture made therefrom.

BACKGROUND OF THE INVENTION

Plastic articles and items with a pleasant haptic appearance, such as a textile-like touch, and good optics are desirable for numerous applications. To improve aesthetics, several techniques of surface modification resulting in various surface structures have been employed.

For example, U.S. Pat. No. 4,629,643 provides a micro-apertured polymeric web exhibiting a pattern of discrete volcano-like aberrations, the end of which includes at least one micro-aperture at its point of maximum amplitude. The web is produced by impinging a jet of high pressure liquid on the exposed surface of a web of flat polymeric film while said film is supported on a fine mesh woven wire support member. The high pressure fluid jet causes micro-aperturing of those portions of the web which coincide with the interstices between the intersecting woven wire filaments comprising the support member and which correspond to the surface aberrations after removal of the web.

U.S. Pat. No. 5,733,628 discloses a film laminate comprising an elastomeric three-dimensional apertured film and a carrier material wherein the carrier material may be a woven or non-woven fibrous material. Non-apertured surface structured films include films with solid or with hollow surface structures.

According to U.S. Pat. No. 5,814,413 surface-texturing of a polymer film is accomplished by taking advantage of the usually undesired phenomenon of melt fracture. The patent discloses extruded films which due to melt fracture show a rough surface texture.

International Patent Application WO 97/02128 provides a process for producing a surface-structured, sheet-like semi-finished product made from thermoplastic polymers. The resulting product is reported to have a velour-like or velvety surface with numerous solid fibrous projections which can be longer than 3 millimeters. According to the disclosed process, the thermoplastic material is extruded in the molten state onto a moving belt or roller surface which is covered with cavities or borings having a depth of between 2 and 4 millimeters. The roller surface is exposed to a vacuum from the outside thus removing the air from the cavities and enabling these to be filled with the thermoplastic material. After solidification of the thermoplastic material, the semi-finished product covered with fiber-like projections is peeled off the surface.

International Patent Application WO 99147339 describes a method for producing a surface-structured, film-like semi-finished product from a thermoplastic comprising forming a pile consisting of solid protuberances and elongating the protruberances by combing, brushing, knife-coating and/or shear pinching.

International Patent Application WO 99/16608 discloses a method for making an embossed oriented film. Said method discloses the steps of softening at least one of the two major surfaces of an oriented film, embossing the softened surface (s), and cooling the resulting embossed oriented thermoplastic film. In order to maintain orientation the combined steps of softening, embossing and cooling should occur within a second.

International Patent Application WO 99/06623 provides a unitary polymer substrate having a plurality of solid microfibers which may have a variety of forms, such as frayed-end microfibers, tapered microfibers, microfibers having an expanded cross-sectional shape and microfibers having a high aspect ratio. The microfibers are reported to increase the surface area and to impart a cloth-like feel.

International Patent Application WO 00/16965 relates to a method for producing a surface-structured, film-like semi-finished product made of a thermoplastic which is applied onto a surface covered with fine cavities. The solidified plastic is removed from the surface as a structured film. The disclosed structure is a pile comprised of solid projections and naps which may be stretched, e.g. by brushing.

Films with bubble-like surface features which are hollow from the bottom are disclosed, for example, in U.S. Pat. No. 4,463,045, International Patent Application WO 96/13979 and U.S. Pat. No. 5,192,484.

U.S. Pat. No. 5,792,411 suggests replicated articles with surface structures of various geometric configuration.

There still is the need for plastic articles, particularly profiles and moldings, showing improved properties, particularly excellent aesthetics, as reflected in a textile-like haptic appearance and low gloss. Further representative properties desirable for plastic articles include, for example, increased surface area, variability of the surface appearance, anti-slip behavior, controlled storage, release or carrier properties, controlled thermal and barrier performance, as well as any combination thereof.

It is an object of the present invention to meet these needs.

It is one object of the present invention to provide surface-structured plastic profiles or moldings with hollow surface structures which can be specifically designed to meet the desired performance attribute(s) and can be produced in a cost effective way.

It is another object of the present invention to provide profiles or moldings with substantially solid fiber-like surface structures.

In particular, it is an object of the present invention to provide a plastic article having a soft, velvety and cloth-like touch in combination with a mat appearance. It is another object to provide a plastic article having an increased surface area. It is yet a further object of the present invention to provide a plastic article with an imprintable surface. The present invention also addresses the problem of providing a plastic article having a frictional behavior indicating anti-slip properties. It is a particular object of the present invention to provide a plastic article, which displays any desired combination of the above-mentioned properties, and may afford additional advantageous performance attributes depending on the intended end-use application(s).

The objects of the present invention are achieved by providing a profile or molding, which is characterized by a distinct structure. Such structure is reflected in the presence of at least one layer having a fringed surface microstructure and, optionally, of further layers affording certain additional functions, for example, rigidity, barrier or mechanical properties. The morphology and composition of the profile or molding of the invention can be tailored to satisfy the particular requirements of the production process and the intended end-use application(s).

SUMMARY OF THE INVENTION

The present invention pertains to a profile or molding. The profile or molding of the invention may be a mono-layer or multi-layer profile or molding and comprises at least one layer which is a thermoplastic polymeric material and which is characterized by a fringed surface microstructure. The fringes of said microstructure are non-perforated crater-like peaks which are at least partially hollow, or substantially solid fiber-like surface aberrations. The layer may be covered by the fringed surface microstructure in its entirety, or in part, e.g. in one area or in several areas. The fringed surface microstructure may be discernible with the naked eye or on appropriate magnification.

Another aspect of the invention relates to insert moldings and composites comprising a profile or molding based on a thermoplastic polymeric material wherein at least one layer has a fringed surface microstructure.

Another aspect of the invention relates to an article of manufacture comprising or made from a profile or molding based on a thermoplastic polymeric material wherein at least one layer has a fringed surface microstructure.

Another aspect of the invention relates to a process for making the profile or molding based on a thermoplastic polymeric material wherein at least one layer has a fringed surface microstructure, said process comprising:

providing a precursor profile or molding with a surface characterized by a pattern of peaks and valleys, and treating said precursor such as to create a surface having a fringed microstructure.

Preferably, the treatment is mechanical in nature.

Yet another aspect of the invention relates to the use of a mono- or multilayer profile or molding which is based on a thermoplastic polymeric material and wherein at least one layer has or comprises the fringed surface microstructure in applications or articles which benefit from the advantageous properties and performance attributes provided by the fringed surface microstructure.

DETAILED DESCRIPTION OF THE INVENTION

Basic Definitions

Figure 1:
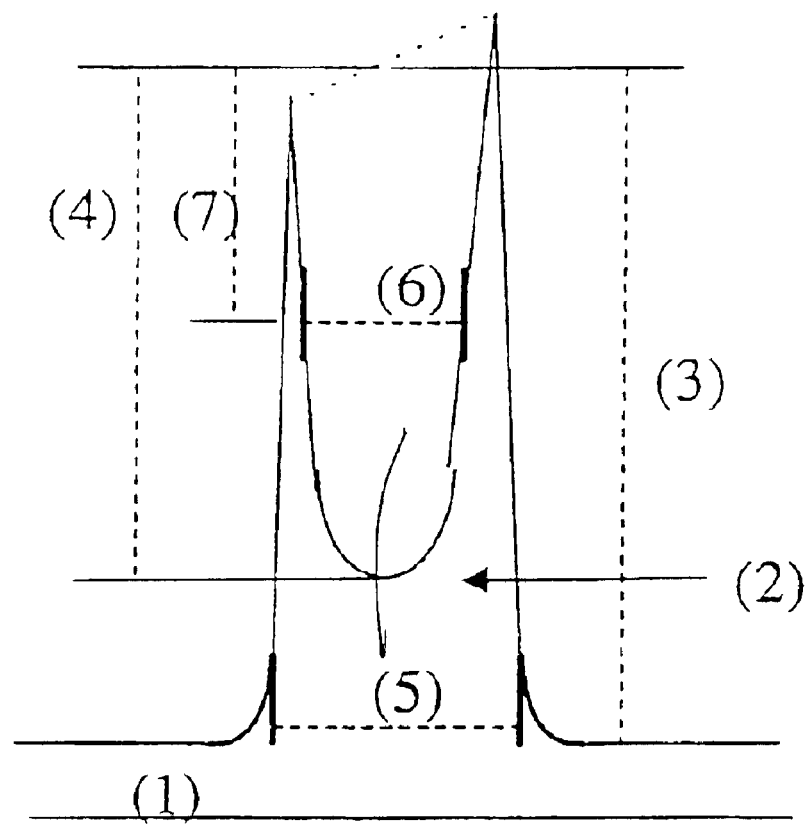
FIG. 1 shows an exemplary individual hollow fringe and selected parameters characterizing its three-dimensional structure.

The term "profile" is used herein in accordance with its conventional meaning and refers to an article made by extrusion through a die, or a combination of dies, to take a special three-dimensional shape or contour. Examples of profiles include, but are not limited to, cylinders, concave or convex items, table edges, window channels and profiles, automobile trim, rods, filaments, pipes, tubes and wire and cable jacketing.

The term "molding" as used herein refers to a shaped article made by use of a mold wherein a material at some stage is softened, melted or liquefied so that it assumes the form of the mold cavity and thereafter hardens or solidifies by cooling or completion of a chemical reaction, or a combination of both.

The term "multi-layer profile or molding" (including each individually e.g. "profile") as used herein indicates a profile or molding consisting of two, three, four, five, six, seven or more layers.

The term "foamed profile or molding" (including each individually e.g. "foamed profile") as used herein refers to a mono-layer or multi-layer structure wherein at least one layer of the structure is foamed and has a density less than the non-foamed polymer.

The term "composite" as used herein refers to a multi-layer or multi-component article or material comprising at least one profile or molding layer having a fringed surface structure, including, for example, but not limited to, a fabric or a laminated structure which may comprise, for example foil, fibers or metal.

The term polymeric material as used herein refers to a polymeric compound obtainable by polymerizing one or more monomers. The generic term "polymeric compound" or "polymer" is intended to include a homopolymer, usually employed to refer to polymers prepared from only one monomer, and an interpolymer as defined hereinafter.

The term "comprising" as used herein means "including".

The term "interpolymer" as used herein refers to polymers prepared by the polymerization of at least two monomers. The generic term interpolymer thus embraces the terms copolymer, usually employed to refer to polymers prepared from two different monomers, and polymers prepared from more than two different monomers, such as terpolymers.

Unless specified otherwise, the term "alpha-olefin" ("α-olefin") as used herein refers to an aliphatic or cyclo-aliphatic alpha-olefin having at least 3, preferably 3 to 20 carbon atoms.

Unless indicated to the contrary, all parts, percentages and ratios are by weight. The expression "up to" when used to specify a numerical range includes any value less than or equal to the numerical value which follows this expression. The expressions "cc" or "ccm" stand for "cubic centimeters".

Thermoplastic Materials

The profile or molding of the invention is based on or made from one or more thermo-plastic polymeric materials, including, for example, latex. Preferred thermoplastic polymeric materials are semicrystalline polymers, amorphous polymers, or blends thereof. Advantageously, suitable thermoplastic polymers may be selected from the group consisting of polyolefins, poly(lactide), alkenyl aromatic polymers, thermoplastic polyurethanes, polycarbonates, polyamides, polyethers, thermoplastic phenoxy resins, polyvinyl chloride polymers, polyvinylidene chloride polymers and polyesters, including certain elastomers and block polymers. Semicrystalline thermoplastic materials and blends thereof are preferred.

Suitable polyolefins include, for example, ethylene-based polymers, including ethylene homopolymer and interpolymer, aliphatic alpha-olefin homopolymers, such as polypropylene, polybutene and polyisoprene, and their interpolymers.

Ethylene homopolymers, for example low density polyethylene (LDPE) and high density polyethylene (HDPE), and ethylene interpolymers are known classes of thermoplastic polymers, each having many members. They are prepared by homopolymerizing ethylene or interpolymerizing (for example, copolymerizing) ethylene with one or more vinyl- or diene-based comonomers, for example, α-olefins of 3 to about 20 carbon atoms, vinyl esters, vinyl acids, styrene-based monomers, monomers containing two or more sites of ethylenic unsaturation, etc., using known copolymerization reactions and conditions.

Ethylene (based) polymers suitable for use in the present invention include both homogeneously branched (homogeneous) polymers and heterogeneously branched (heterogeneous) polymers.

"Homogeneous" polymers encompass ethylene-based interpolymers in which any comonomer is randomly distributed within a given interpolymer molecule and substantially all of the interpolymer molecules have the same ethylene/comonomer ratio within that interpolymer. Homogeneous ethylene polymers generally are characterized as having an essentially single melting (point) peak between −30° C. and 150° C., as determined by differential scanning calorimetry (DSC). The single melting peak may be relatively broad, such as is the case when an ethylene polymer having a crystallinity of less than about 36 percent is employed. The single melting peak may be sharp, such as is the case when an ethylene polymer having a crystallinity of at least about 36 percent is employed.

Typically, homogeneous ethylene polymers will also have a relatively narrow molecular weight distribution (MWD) as compared to corresponding heterogeneous ethylene polymers. Preferably, the molecular weight distribution defined as the ratio of weight average molecular weight to number average molecular weight ($M_w/M_n$), is less than about 3.5 (when the density of the interpolymer is less than about 0.960 g/cc), more preferably less than about 3.0.

In addition or in the alternative, the homogeneity of the ethylene-based polymers is reflected in a narrow composition distribution, which can be expressed using parameters such SCBDI (Short Chain Branch Distribution Index) or (CDBI Composition Distribution Branch Index). The SCBDI of a polymer is readily calculated from data obtained from techniques known in the art, such as, for example, temperature rising elution fractionation (abbreviated herein as "TREF") as described, for example, in Wild et al, Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. CDBI is defined as the weight percent of the polymer molecules having a comonomer content within 50 percent of the median total molar comonomer content. The SCBDI or CDBI for the homogeneous linear and substantially linear ethylene/alpha-olefin polymers used in the present invention is typically greater than about 50 percent.

The homogeneous ethylene polymers that can be used in the present invention fall into two broad categories, the linear homogeneous ethylene polymers and the substantially linear homogeneous ethylene polymers. Both are known.

Homogeneous linear ethylene polymers have long been commercially available. As exemplified in U.S. Pat. No. 3,645,992 to Elston, homogeneous linear ethylene polymers can be prepared in conventional polymerization processes using Ziegler-type catalysts such as, for example, zirconium and vanadium catalyst systems. U.S. Pat. No. 4,937,299 to Ewen et al. and U.S. Pat. No. 5,218,071 to Tsutsui et al. disclose the use of metallocene catalysts, such as catalyst systems based on hafnium, for the preparation of homogeneous linear ethylene polymers. Commercially available examples of homogeneous linear ethylene polymers include, for example, those sold by Mitsui Petrochemical Industries as TAFMER™ resins and by Exxon Chemical Company as EXACT™ and EXCEED™ resins.

The substantially linear ethylene polymers (SLEPs) are homogeneous polymers having long chain branching.

The term "substantially linear ethylene polymer" as used herein means that the bulk ethylene polymer is substituted, on average, with about 0.01 long chain branches/1000 total carbons to about 3 long chain branches/1000 total carbons (wherein "total carbons" includes both backbone and branch carbon atoms). Preferred polymers are substituted with about 0.01 long chain branches/1000 total carbons to about 1 long chain branches/1000 total carbons, more preferably from about 0.05 long chain branches/1000 total carbons to about 1 long chain branched/1000 total carbons, and especially from about 0.3 long chain branches/1000 total carbons to about 1 long chain branches/1000 total carbons.

As used herein, the term "backbone" refers to a discrete molecule, and the term "polymer" or "bulk polymer" refers, in the conventional sense, to the polymer as formed in a reactor. For the polymer to be a "substantially linear ethylene polymer", the polymer must have at least enough molecules with long chain branching such that the average long chain branching in the bulk polymer is at least an average of from about 0.01/1000 total carbons to about 3 long chain branches/1000 total carbons.

The term "bulk polymer" as used herein means the polymer which results from the polymerization process as a mixture of polymer molecules and, for substantially linear ethylene polymers, includes molecules having an absence of long chain branching as well as molecules having long chain branching. Thus a "bulk polymer" includes all molecules formed during polymerization. It is understood that, for the substantially linear polymers, not all molecules have long chain branching, but a sufficient amount do such that the average long chain branching content of the bulk polymer positively affects the melt rheology (i.e., the melt fracture properties) as described herein below and elsewhere in the literature.

Long chain branching (LCB) is defined herein as a chain length of at least one (1) carbon (atom) less than the number of carbons in the comonomer, whereas short chain branching (SCB) is defined herein as a chain length of the same number of carbons in the residue of the comonomer after it is incorporated into the polymer molecule backbone. For example, a substantially linear ethylene/1-octene polymer has backbones with long chain branches of at least seven (7) carbons in length, but it also has short chain branches of only six (6) carbons in length.

Long chain branching can be distinguished from short chain branching by using $^{13}C$ nuclear magnetic resonance (NMR) spectroscopy and to a limited extent, e.g. for ethylene homopolymers, it can be quantified using the method of Randall, (Rev. Macromol.Chem. Phys., C29 (2&3), p. 285–297), the disclosure of which is incorporated herein by reference. However as a practical matter, current $^{13}C$ nuclear magnetic resonance spectroscopy cannot determine the length of a long chain branch in excess of about six (6) carbon atoms and as such, this analytical technique cannot distinguish between a seven (7) carbon branch and a seventy (70) carbon branch. The long chain branch can be as long as about the same length as the length of the polymer backbone.

Although conventional $^{13}C$ nuclear magnetic resonance spectroscopy cannot determine the length of a long chain branch in excess of six carbon atoms, there are other known techniques useful for quantifying or determining the presence of long chain branches in ethylene polymers, including ethylene/1-octene interpolymers. For example, U.S. Pat. No. 4,500,648, incorporated herein by reference, teaches that long chain branching frequency (LCB) can be represented by the equation LCB=b/$M_w$, wherein b is the weight average number of long chain branches per molecule and $M_w$ is the weight average molecular weight. The molecular weight averages and the long chain branching characteristics are determined by gel permeation chromatography and intrinsic viscosity methods, respectively.

Two other useful methods for quantifying or determining the presence of long chain branches in ethylene polymers, including ethylene/1-octene interpolymers are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., *J. Chem. Phys.*, 17, 1301 (1949) and Rudin, A., *Modern Methods of Polymer Characterization*, John Wiley & Sons, New York (1991) pp. 103–112, the disclosures of both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is indeed a useful technique for quantifying the presence of long chain branches in substantially linear ethylene polymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

DeGroot and Chum also showed that a plot of log($I_2$, melt index) as a function of log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For substantially linear ethylene polymers, the empirical effect of the presence of long chain branching is manifested as enhanced rheological properties which are quantified and expressed in terms of gas extrusion rheometry (GER) results and/or melt flow, $I_{10}/I_2$, increases.

The substantially linear ethylene polymers suitable for the purpose of the present invention are a unique class of compounds that are further defined in U.S. Pat. No. 5,272,236, U.S. Pat. No. 5,278,272, and U.S. Pat. No. 5,665,800, each of which is incorporated herein by reference. SLEPs are available from The Dow Chemical Company as polymers made by the INSITE™ Process and Catalyst Technology, such as AFFINITY™ polyolefin plastomers (POPs), and from DuPont Dow Elastomers, L.L.C. as ENGAGE™ polyolefin elastomers (POEs).

Substantially linear ethylene polymers differ significantly from the class of polymers conventionally known as homogeneously branched linear ethylene polymers described above. As an important distinction, substantially linear ethylene polymers do not have a linear polymer backbone in the conventional sense of the term "linear" as is the case for homogeneously branched linear ethylene polymers. Substantially linear ethylene polymers also differ significantly from the class of polymers known conventionally as heterogeneously branched traditional Ziegler polymerized linear ethylene interpolymers (for example, ultra low density polyethylene, linear low density polyethylene (LLDPE) or high density polyethylene (HDPE) made, for example, using the technique disclosed by Anderson et al. in U.S. Pat. No. 4,076,698, in that substantially linear ethylene interpolymers are homogeneously branched polymers; that is, substantially linear ethylene polymers have a SCBDI greater than or equal to 50 percent; preferably greater than or equal to 70 percent, more preferably greater than or equal to 90 percent. Substantially linear ethylene polymers also differ from the class of heterogeneously branched ethylene polymers in that substantially linear ethylene polymers are characterized as essentially lacking a measurable high density or crystalline polymer fraction as determined using a temperature rising elution fractionation technique.

The substantially linear ethylene polymer for use in the present invention can be characterized as having (a) melt flow ratio, $I_{10}/I_2 \square 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$ and $M_w/M_n$ within ten percent of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between —30° C. and 150° C., and (e) a short chain branching distribution index greater than 50 percent.

Determination of the critical shear rate and critical shear stress in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977) and in *Rheometers for Molten Plastics* by John Dealy, published by Van Nostrand Reinhold Co. (1982) on pp. 97–99, the disclosures of both of which are incorporated herein by reference.

The processing index (PI) is measured at a temperature of 190° C., at nitrogen pressure of 2500 psig using a 0.0296 inch (752 micrometers) diameter die for high flow polymers, e.g. 50–100 $I_2$ melt index or greater), 20:1 L/D die having an entrance angle of 180°. The GER processing index is calculated in millipoise units from the following equation:

$$PI=2.15\times10^6 \text{ dyne/cm}^2/(1000\times\text{shear rate}),$$

wherein: $2.15\times10^6$ dyne/cm² is the shear stress at 2500 psi, and the shear rate is the shear rate at the wall as represented by the following equation:

$$32\ Q'/(60\ \text{sec/min})(0.745)(\text{Diameter}\times 2.54\ \text{cm/in})^3, \text{ wherein:}$$

Q' is the extrusion rate (gms/min),
0.745 is the melt density of polyethylene (gm/cm³), and
Diameter is the orifice diameter of the capillary (inches).

The PI is the apparent viscosity of a material measured at apparent shear stress of $2.15\times10^6$ dyne/cm².

For substantially linear ethylene polymers, the PI is less than or equal to 70 percent of that of a conventional linear ethylene polymer having an $I_2$, $M_w/M_n$ and density each within ten percent of the substantially linear ethylene polymer.

An apparent shear stress vs. apparent shear rate plot is used to identify the melt fracture phenomena over a range of nitrogen pressures from 5250 to 500 psig using the die or GER test apparatus previously described. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40×magnification. The critical shear rate at onset of surface melt fracture for the substantially linear ethylene polymers is at least 50 percent greater than the critical shear rate at the onset of surface melt fracture of a linear ethylene polymer having about the same $I_2$ and $M_w/M_n$. Preferably, the critical shear stress at onset of surface melt fracture for the substantially linear ethylene polymers of the invention is greater than about $2.8\times10^6$ dyne/cm².

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and critical shear stress at onset of gross melt fracture (OGMF) will be used herein based on the changes of surface roughness and configurations of the extrudates extruded by a GER. For the substantially linear ethylene polymers used in the invention, the critical shear stress at onset of gross melt fracture is preferably greater than about $4\times10^6$ dyne/cm².

For the processing index determination and for the GER melt fracture determination, substantially linear ethylene polymers are tested without inorganic fillers and do not have more than 20 ppm aluminum catalyst residue. Preferably however, for the processing index and melt fracture tests, substantially linear ethylene polymers do contain antioxidants such as phenols, hindered phenols, phosphites or phosphonites, preferably a combination of a phenol or hindered phenol and a phosphate or a phosphonite.

The molecular weight distributions of ethylene polymers are determined by gel permeation chromatography (GPC) on a Waters 150° C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968, the disclosure of which is incorporated herein by reference) to derive the following equation:

$$M_{polyethylene}=a*(M_{polystyrene})^b.$$

In this equation, a=0.4316 and b=1.0. Weight average molecular weight, $M_w$, is calculated in the usual manner according to the following formula:

$$Mj=(\Sigma w_i(M_i)^j)^j;$$

wherein $w_i$ is the weight fraction of the molecules with molecular weight $M_i$ eluting from the GPC column in fraction i and j=1 when calculating $M_w$ and j=−1 when calculating $M_n$.

Substantially linear ethylene polymers are known to have excellent processability, despite having a relatively narrow molecular weight distribution (that is, the $M_w/M_n$ ratio is typically less than about 3.5). Surprisingly, unlike homogeneously and heterogeneously branched linear ethylene polymers, the melt flow ratio ($I_{10}/I_2$) of substantially linear ethylene polymers can be varied essentially independently of the molecular weight distribution, $M_w/M_n$.

Suitable constrained geometry catalysts for manufacturing substantially linear ethylene polymers include constrained geometry catalysts as disclosed in U.S. application Ser. No. 07/545,403, filed Jul. 3, 1990; U.S. application Ser. No. 071758,654, filed Sep. 12, 1991; U.S. Pat. No. 5,132,380; U.S. Pat. No. 5,064,802; U.S. Pat. No. 5,470,993; U.S. Pat. No. 5,453,410; U.S. Pat. No. 5,374,696; U.S. Pat. No. 5,532,394; U.S. Pat. No. 5,494,874; and U.S. Pat. No. 5,189,192, the teachings of all of which are incorporated herein by reference.

Suitable catalyst complexes may also be prepared according to the teachings of WO 93/08199, and the patents issuing therefrom, all of which are incorporated herein by reference. Further, the monocyclopentadienyl transition metal olefin polymerization catalysts taught in U.S. Pat. No. 5,026,798, which is incorporated herein by reference, are also believed to be suitable for use in preparing the polymers of the present invention, so long as the polymerization conditions substantially conform to those described in U.S. Pat. No. 5,272,236; U.S. Pat. No. 5,278,272 and U.S. Pat. No. 5,665,800, especially with strict attention to the requirement of continuous polymerization. Such polymerization methods are also described in PCT/US 92/08812 (filed Oct. 15, 1992).

The foregoing catalysts may be further described as comprising a metal coordination complex comprising a metal of groups 3-10 or the Lanthanide series of the Periodic Table of the Elements and a delocalize β-bonded moiety substituted with a constrain-inducing moiety, said complex having a constrained geometry about the metal atom such that the angle at the metal between the centroid of the delocalized, substituted pi-bonded moiety and the center of at least one remaining substituent is less than such angle in a similar complex containing a similar pi-bonded moiety lacking in such constrain-inducing substituent, and provided further that for such complexes comprising more than one delocalized, substituted pi-bonded moiety, only one thereof for each metal atom of the complex is a cyclic, delocalized, substituted pi-bonded moiety. The catalyst further comprises an activating cocatalyst.

Suitable cocatalysts for use herein include polymeric or oligomeric aluminoxanes, especially methyl aluminoxane, as well as inert, compatible, noncoordinating, ion forming compounds. So called modified methyl aluminoxane (MMAO) is also suitable for use as a cocatalyst. One technique for preparing such modified aluminoxane is disclosed in U.S. Pat. No. 5,041,584, the disclosure of which is incorporated herein by reference. Aluminoxanes can also be made as disclosed in U.S. Pat. No. 5,218,071; U.S. Pat. No. 5,086,024; U.S. Pat. No. 5,041,585; U.S. Pat. No. 5,041,583; U.S. Pat. No. 5,015,749; U.S. Pat. No. 4,960,878; and U.S. Pat. No. 4,544,762, the disclosures of all of which are incorporated herein by reference.

Aluminoxanes, including modified methyl aluminoxanes, when used in the polymerization, are preferably used such that the catalyst residue remaining in the (finished) polymer is preferably in the range of from about 0 to about 20 ppm aluminum, especially from about 0 to about 10 ppm aluminum, and more preferably from about 0 to about 5 ppm aluminum. In order to measure the bulk polymer properties (e.g. PI or melt fracture), aqueous HCl is used to extract the aluminoxane from the polymer. Preferred cocatalysts, however, are inert, noncoordinating, boron compounds such as those described in EP-A-0520732, the disclosure of which is incorporated herein by reference.

Substantially linear ethylene are produced via a continuous (as opposed to a batch) controlled polymerization process using at least one reactor (e.g., as disclosed in WO 93107187, WO 93107188, and WO 93107189, the disclosure of each of which is incorporated herein by reference), but can also be produced using multiple reactors (e.g., using a multiple reactor configuration as described in U.S. Pat. No. 3,914,342, the disclosure of which is incorporated herein by reference) at a polymerization temperature and pressure sufficient to produce the interpolymers having the desired properties. The multiple reactors can be operated in series or in parallel, with at least one constrained geometry catalyst employed in at least one of the reactors.

Substantially linear ethylene polymers can be prepared via the continuous solution, slurry, or gas phase polymerization in the presence of a constrained geometry catalyst, such as the method disclosed in EP-A416,815, the disclosure of which is incorporated herein by reference. The polymerization can generally be performed in any reactor system known in the art including, but not limited to, a tank reactor(s), a sphere reactor(s), a recycling loop reactor(s) or combinations thereof and the like, any reactor or all reactors operated partially or completely adiabatically, nonadiabatically or a combination of both and the like. Preferably, a continuous loop-reactor solution polymerization process is used to manufacture the substantially linear ethylene polymer used in the present invention.

In general, the continuous polymerization required to manufacture substantially linear ethylene polymers may be accomplished at conditions well known in the prior art for Ziegler-Natta or Kaminsky-Sinn type polymerization reactions, that is, temperatures from 0 to 250° C. and pressures from atmospheric to 1000 atmospheres (100 MPa). Suspension, solution, slurry, gas phase or other process conditions may be employed if desired.

A support may be employed in the polymerization, but preferably the catalysts are used in a homogeneous (i.e., soluble) manner. It will, of course, be appreciated that the active catalyst system forms in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

Preferably, the substantially linear ethylene polymers used in the present invention are interpolymers of ethylene with at least one $C_3$–$C_{20}$ □-olefin and/or $C_4$–$C_{18}$ diolefin, in accordance with the definitions and preferences given hereinbelow. Copolymers of ethylene and an □-olefin of $C_3$–$C_{20}$ carbon atoms are preferred.

Heterogeneous ethylene-based polymers encompass ethylene/α-olefin interpolymers characterized as having a linear backbone and a DSC melting curve having a distinct melting point peak greater than 115° C. attributable to a high density fraction. Such heterogeneous interpolymers will typically have a broader molecular weight distribution than homogeneous interpolymers, as reflected in a $M_w/M_n$ ratio of greater than about 3.5 (when the density of the interpolymer is less than about 0.960 g/cc). Typically, heterogeneous ethylene interpolymers have a CDBI of about 50% or less, indicating that such interpolymers are a mixture of molecules having differing comonomer contents and differing amounts of short chain branching.

The heterogeneous ethylene polymers that can be used in the practice of this invention fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 g/cc. Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HOPE is well known, commercially available in various grades, and may be used in this invention.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (for example, 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 g/cc to about 0.91 g/cc.

Both the materials made by the free radical catalysts and by the coordination catalysts are well known in the art, as are their methods of preparation. For example, heterogeneous linear ethylene polymers are available from The Dow Chemical Company as DOWLEX™ LLDPE polymers and as ATTANE™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al., which is incorporated herein by reference.

As indicated above, the ethylene polymers suitable for the purpose of the present invention can be interpolymers of ethylene and at least one α-olefin. Suitable α-olefins for use as comonomers in a solution, gas phase or slurry polymerization process or combinations thereof include 1-propylene, 1-butene, 1-isobutylene, 1-pentene, 1-hexene, 4-methyl-1-pentene, 1-heptene and 1-octene, as well as other monomer types such as tetrafluoroethylene, vinyl benzocyclobutane, 1,4-hexadiene, 1,7-octadiene, and cycloalkenes, for example cyclopentene, cyclohexene, cyclooctene, norbornene (NB), and ethylidene norbornene (ENB)). Preferably, the α-olefin will be 1-butene, 1-pentene, 4-methyl-1-pentene, 1-hexene, 1-heptene, 1-octene, NB or ENB, or mixtures thereof. More preferably, the α-olefin will be 1-pentene, 1-hexene, 1-heptene, 1-octene, or mixtures thereof. Most preferably, the α-olefin will be 1-octene.

Ethylene/α-olefin/diene terpolymers may also be used as elastomeric polymers in this invention. Suitable α-olefins include the α-olefins described above as suitable for making ethylene α-olefin copolymers. The dienes suitable as monomers for the preparation of such terpolymers are typically non-conjugated dienes having from 6 to 15 carbon atoms. Representative examples of suitable non-conjugated dienes that may be used to prepare the terpolymer include:

a) Straight chain acyclic dienes such as 1,4-hexadiene, 1,5-heptadiene, and 1,6-octadiene;
b) branched chain acyclic dienes such as 5-methyl-1, 4-hexadiene, 3,7-dimethyl-1-6-octadiene, and 3,7-dimethyl-1,7-octadiene;
c) single ring alicyclic dienes such as 4-vinylcyclohexene, 1-allyl4-isopropylidene cyclohexane, 3-allylcyclopentene, 4-allylcyclohexene, and 1-isopropenyl4butenylcyclohexane;
d) multi-ring alicyclic fused and bridged ring dienes such as dicyclopentadiene; alkenyl, alkylidene, cycloalkenyl and cycloalkylidene norbornenes such as 5-methylene-2-norbornene, 5-methylene-6methyl-2-norbornene, 5-methylene-6, 6-dimethyl-2-norbornene, 5-propenyl-2-norbornene, 5-(3-cyclopentenyl)2-norbornene, 5-ethylidene-2-norbornene, 5cyclohexylidene-2-norbornene, etc.

The preferred dienes are selected from the group consisting of 1,4-hexadiene, dicyclopentadiene, 5-ethylidene-2-norbornene, 5-methylene-2-norbornene, 7-methyl-1, 6 octadiene, piperylene, 4-vinylcyclohexene, etc.

The preferred terpolymers for the practice of the invention are terpolymers of ethylene, propylene and a non-conjugated diene (EPDM). Such terpolymers are commercially available. Ethylene/α-olefin/diene terpolymers are useful when it is desired to make elastomeric polymer blends vulcanizable with the well known sulfur compound vulcanization process.

Ethylene/unsaturated carboxylic acid, salt and ester interpolymers may also be used in this invention. These are interpolymers of ethylene with at least one comonomer selected from the group consisting of vinyl esters of a saturated carboxylic acid wherein the acid moiety has up to 4 carbon atoms, unsaturated mono- or dicarboxylic acids of 3 to 5 carbon atoms, a salt of the unsaturated acid, esters of the unsaturated acid derived from an alcohol having 1 to 8 carbon atoms, and mixtures thereof. Terpolymers of ethylene and these comonomers are also suitable. Ionomers, which are completely or partially neutralized copolymers of ethylene and the acids described above, are discussed in more detail in U.S. Pat. No. 3,264,272, already incorporated herein by reference. In addition, terpolymers of ethylene/ vinyl acetate/carbon monoxide or ethylene/methyl acrylate/ carbon monoxide containing up to about 15 percent by weight of carbon monoxide can also be employed.

Suitable ethylene/unsaturated carboxylic acid, salt and ester interpolymers include ethylene/vinyl acetate (EVA) including, but not limited to, the stabilized EVA described in U.S. Pat. No. 5,096,955, which is incorporated herein by reference; ethylene/acrylic acid (EMA) and its ionomers; ethylene/methacrylic acid and its ionomers; ethylene/methyl acrylate; ethylene/ethyl acrylate; ethylene/isobutyl acrylate; ethylene/normal butyl acrylate; ethylene/isobutyl acrylate/ methacrylic acid and its ionomers; ethylene/normal butyl acrylate/methacrylic acid and its ionomers; ethylene/ isobutyl acrylate/acrylic acid and its ionomers; ethylene/ normal butyl acrylate/acrylic acid and its lonomers; ethylene/methyl methacrylate; ethylene/vinyl acetate/ methacrylic acid and its lonomers; ethylene/vinyl acetate/ acrylic acid and its ionomers; ethylene/vinyl acetate/carbon monoxide; ethylene/methacrylate/carbon monoxide; ethylene/normal butyl acrylate/carbon monoxide; ethylene/ isobutyl acrylate/carbon monoxide; ethylene/vinyl acetate/ monoethyl maleate and ethylene/methyl acrylate/monoethyl maleate. Particularly suitable copolymers are EVA; EMA; ethylene/methyl acrylate; ethylene/isobutyl acrylate: and ethylene/methyl methacrylate copolyers and mixtures thereof. Certain properties, such as tensile elongation, are taught to be improved by certain combinations of these ethylene interpolymers described in U.S. Pat. No. 4,379,190, which is incorporated herein by reference. The procedures for making these ethylene interpolymers are well known in the art and many are commercially available.

Propylene based polymers are also suitable to make a profile or molding according to this invention. Such propylene based polymers are, for example, homopolypropylene and propylene interpolymers, such as copolymers of propylene with ethylene and/or a $C_4$–$C_{20}$ alpha-olefin, including impact copolymers and polypropylene random copolymers.

Further thermoplastic interpolymers suitable to practice the present invention are polyolefin interpolymers comprising i) polymer units derived from at least one of ethylene and/or an alpha-olefin monomer; and
ii) polymer units derived from one or more vinyl or vinylidene aromatic monomers and/or one or more sterically hindered aliphatic or cycloaliphatic vinyl or vinylidene monomers, or a combination of at least one aromatic vinyl or vinylidene monomer, and iii) optionally polymer units derived from one or more ethylenically unsaturated polymerizable monomer(s) other than those derived from i) and ii).

Suitable α-olefins include, for example, α-olefins containing from 3 to about 20, preferably from 3 to about 12, more preferably from 3 to about 8 carbon atoms. These α-olefins do not contain an aromatic moiety. Particularly suitable are ethylene, propylene, butene-1, 4-methyl-1-pentene, hexene-1 or octene-1 or ethylene in combination with one or more of propylene, butene-1, 4-methyl-1-pentene, hexene-1 or octene-1.

Polymerizable ethylenically unsaturated monomer(s) include strained ring olefins such as norbornene and $C_1$–$C_{10}$ alkyl or $C_6$–$C_{10}$ aryl substituted norbornenes, with an exemplary interpolymer being ethylene/styrene/norbornene.

Suitable vinyl or vinylidene aromatic monomers include, for example, those represented by the following formula:

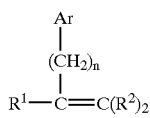

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_1$–$C_4$-alkyl, and $C_1$–$C_4$-haloalkyl; and n has a value from zero to about 4, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. The most preferred aromatic vinyl monomer is styrene.

By the term "sterically hindered aliphatic or cycloaliphatic vinyl or vinylidene compounds", it is meant addition polymerizable vinyl or vinylidene monomers corresponding to the formula:

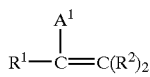

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system.

By the term "sterically bulky" it is meant that the monomer bearing this substituent is normally incapable of addition polymerization by standard Ziegler-Natta polymerization catalysts at a rate comparable with ethylene polymerizations.

Ethylene and alpha-olefins having a linear aliphatic structure such as propylene, butene-1, hexene-1 and octene-1 are not considered to be sterically hindered aliphatic monomers.

Preferred sterically hindered aliphatic or cycloaliphatic vinyl or vinylidene compounds are monomers in which one of the carbon atoms bearing ethylenic unsaturation is tertiarily or quaternarly substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene. Simple linear non-branched α-olefins including for example, α-olefins containing from 3 to about 20 carbon atoms such as propylene, butene-1, 4-methyl-1-pentene, hexene-1 or octene-1 are not examples of sterically hindered aliphatic or cycloaliphatic vinyl or vinylidene compounds.

The interpolymers comprising polymer units defined above under i), ii) and iii) can be substantially random, pseudo-random, random, alternating, diadic, triadic, tetradic or any combination thereof. That is, the interpolymer product can be variably incorporated and optionally variably sequenced. The preferred sequence is substantially random. The preferred substantially random interpolymers are the so-called pseudo-random interpolymers as described in EP-A-0 416 815 by James C. Stevens et al. and U.S. Pat. No. 5,703,187 by Francis J. Timmers, both of which are incorporated herein by reference in their entirety.

The preferred polyolefin interpolymer are ethylene/styrene interpolymers. Particularly preferred are substantially random ethylene/styrene interpolymers.

The term "variably incorporated" as used herein refers to an interpolymer, particularly an ethylene/styrene interpolymer, manufactured using at least two catalyst systems wherein during interpolymerization the catalyst systems are operated at different incorporation or reactivity rates. For example, the interpolymer product having a total styrene content of 36 weight percent is variably incorporated where one catalyst system incorporates 22 weight percent styrene and the other catalyst system incorporates 48 weight percent styrene and the production split between the two catalyst systems is 47/53 weight percentages.

Representative "pseudo-random" interpolymers are the ethylene/styrene interpolymers described in U.S. Pat. No. 5.703,187, the disclosure of which is incorporated herein in its entirety by reference.

"Random" interpolymers are those in which the monomer units are incorporated into the chain such that there exist various combinations of ordering including blockiness, e.g. where either the ethylene or the aliphatic alpha-olefin monomer or the sterically hindered vinylidene monomer or both can be repeated adjacent to one another.

Representative "alternating" interpolymers are, for example, alternating ethylene/styrene interpolymers in which the ethylene and the sterically hindered vinylidene monomer occur in repeat alternate sequences on the polymer chain in atactic or stereospecific structures (such as isotactic or syndiotactic) or in combinations of the general formula $(AB)_n$.

The term "substantially random" as used herein in reference to the interpolymers comprising the above-mentioned monomers i), ii) and iii), and to ethylene/styrene interpolymers in particular, generally means that the distribution of the monomers of the interpolymer can be described by the Bernoulli statistical model or by a first or second order Markovian statistical model, as described by J. C. Randall in *Polymer Sequence Determination, Carbon*-13 *NMR Method*, Academic Press New York, 1977, pp. 71–78, the disclosure of which is incorporated herein by reference. Substantially random interpolymers do not contain more than 15 mole percent of the total amount of vinyl or vinylidene aromatic monomer in blocks of vinyl or vinylidene aromatic monomer of more than 3 units.

Preferably, the substantially random interpolymer is not characterized by a high degree (greater than 50 mole percent) of either isotacticity or syndiotactic. This means that in the carbon-13 NMR spectrum of the substantially random interpolymer, the peak areas corresponding to the main chain methylene and methine carbons representing either meso diad sequences or racemic diad sequences should not exceed 75 percent of the total peak area of the main chain methylene and methine carbons.

A preferred method of preparation of the substantially random interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerizauon.

Examples of suitable catalysts and methods for preparing the substantially random interpolymers are disclosed in EP-A-514,828); as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185, all of which patents and applications are incorporated herein by reference.

The substantially random α-olefin/vinyl aromatic interpolymers can also be prepared by the methods described in JP 07/278230 employing compounds shown by the general formula

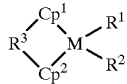

wherein $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; m is a group IV metal, preferably Zr or Hf, most preferably Zr; and $R^3$ is an alkylene group or silanediyl group used to cross-link $Cp^1$ and $Cp^2$.

The substantially random α-olefin/vinyl aromatic interpolymers can also be prepared by the methods described by John G. Bradfute et al. (W. R. Grace & Co.) in WO 95132095; by R. B. Pannell (Exxon Chemical Patents, Inc.) in WO 94100500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4,1996 and WO 98/09999 both by Francis J. Timmers et al. These interpolymers contain additional signals in their carbon-13 NMR spectra with intensities greater than three times the peak to peak noise. These signals appear in the chemical shift ranges of 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomerlethylene tetrad will give rise to similar carbon-13 NMR peaks but with slightly different chemical shifts.

These interpolymers can be prepared by conducting the polymerization at temperatures of from about −30° C. to about 250° C. in the presence of such catalysts as those represented by the formula

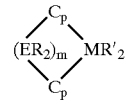

wherein: each Cp is independently, each occurrence, a substituted cyclopentadienyl group π-bound to M; E is carbon or Si; M is a group IV metal, preferably Zr or Hf, most preferably Zr; each R is independently, each occurrence, hydrogen, hydrocarbyl, silahydrocarbyl, or hydrocarbylsilyl, containing up to about 30 preferably from 1 to about 20 more preferably from 1 to about 10 carbon or silicon atoms; each $R^1$ is independently, each occurrence, hydrogen, halo, hydrocarbyl, hyrocarbyloxy, silahydrocarbyl, hydrocarbylsilyl containing up to about 30, preferably from 1 to about 20, more preferably from 1 to about 10 carbon or silicon atoms or two $R^1$ groups together can be a $C_1$–$C_{10}$ hydrocarbyl substituted 1,3-butadiene; M is 1 or 2; and optionally, but preferably in the presence of an activating cocatalyst. Particularly, suitable substituted cyclopentadienyl groups include those illustrated by the formula:

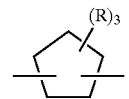

wherein each R is independently, each occurrence, hydrogen, hydrocarbyl, silahydrocarbyl, or hydrocarbylsilyl, containing up to about 30, preferably from 1 to about 20, more preferably from 1 to about 10 carbon or silicon atoms or two r groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanedlyl)-bis-(2-methyl-4- phenylindenyl) zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl4-phenylindenyl) zirconium di-$C_{1-4}$alkyl, racemic-(dimethylsilanediyl)-bis-(2-methyl4-phenylindenyl) zirconium di-$C_1$–$C_4$ alkoxide, or any combination thereof and the like.

It is also possible to use the following titanium-based constrained geometry catalysts, [N-(1,1-dimethylethyl)1,1-dimethyl-1-[(1,2,3,4,5-η)-1,5,6,7-tetrahydro-s-indacen-1-yl]slanaminato(2-)-N]titanium dimethyl; (1-indenyl)(tert-butylamido)dimethyl-silane titanium dimethyl; ((3-tert-butyl)(1,2,3,4,5-η)-1-indenyl)(tert-butylamido) dimethylsbane titanium dimethyl; and ((3-iso-propyl)(1,2,3,4,5-η)-1-indenyl)(tert-butyl amido)dimethylsilane titanium dimethyl, or any combination thereof and the like.

Further preparative methods for the interpolymers used in the present invention have been described in the literature. Longo and Grassi (Makromol. Chem., Volume 191, pages 2387 to 2396 [1990]) and D'Anniello et al. (Joumal of Applied Polymer Science, Volume 58, pages 1701–1706 [1995]) reported the use of a catalytic system based on methylalumoxane (MAO) and cydopentadienyltitanium trichloride (CpTiCl$_3$) to prepare an ethylene-styrene copolymer. Xu and Lin (Polymer Preprints, Am. Chem. Soc., Div. Polym. Chem., Vol. 35, pages 686–687 [19941]) have reported copolymerization using a MgCl$_2$/TiCl$_4$/NdCl$_3$/Al (iBu)$_3$ catalyst to give random copolymers of styrene and propylene. Lu et al. (Joumal of Applied Polymer Science, Vol. 53, pp. 1453 to 1460, 1994) have described the copolymerization of ethylene and styrene using a TiCl$_4$/NdCl$_3$/MgCl$_2$/Al(Et)$_3$ catalyst. Sernetz and Mulhaupt, (Macromol. Chem. Phys., Vol. 197, pp. 1071–1083, 1997) have described the influence of polymerization conditions on the copolymerization of styrene with ethylene using Me$_2$Si (Me$_4$Cp)(n-tert-butyl)TiCl$_2$/methylaluminoxane Ziegler-Natta catalysts. Copolymers of ethylene and styrene produced by bridged metallocene catalysts have been described by Arai, Toshiaki and Suzuki (Polymer Preprints, Am. Chem. Soc., Div. Polym. Chem., Volume 38, pages 349–350, 1997; U.S. Pat. No. 5,883,213 and DE-A-197 11 339) and in U.S. Pat. No. 5,652,315, issued to Mitsui Toatsu Chemicals, Inc. The manufacture of α-olefin/vinyl aromatic monomer interpolymers such as propyleneistyrene and butene/styrene is as described in U.S. Pat. No. 5,244,996, issued to Mitsui Petrochemical Industries Ltd. or U.S. Pat. No. 5,652,315 also issued to Mitsui Petrochemical Industries Ltd, or as disclosed in DE-A-197 11 339 to Denki Kagaku Kogyo K K. All the above methods disclosed for preparing the interpolymer component are incorporated herein by reference. Also, although of high isotacticity and therefore not "substantially random", the random copolymers of ethylene and styrene as disclosed in Polymer Preprints Vol. 39, No. 1, March 1998 by Toru Aria et al. can also be employed for the purposes of the present invention.

While preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated.

The substantially random interpolymer usually contains from about 5 to about 65, preferably from about 5 to about 55; more preferably from about 10 to about 50 mole percent of at least one vinyl or vinylidene aromatic monomer; or sterically hindered aliphatic or cycloaliphatic vinyl or vinylidene monomer; or both; and from about 35 to about 95, preferably from about 45 to about 95, more preferably from about 50 to about 90 mole percent of ethylene and/or at least one aliphatic α-olefin having from about 3 to about 20 carbon atoms.

The most preferred substantially random interpolymers are interpolymers of ethylene and styrene and interpolymers of ethylene, styrene and at least one alpha-olefin containing from 3 to 8 carbon atoms.

The presence of other polymerizable ethylenically unsaturated monomer(s) is optional.

The density of the substantially random interpolymer is generally about 0.930 g/cm$^3$ or more, preferably from about 0.930 to about 1.045 g/cm$^3$, more preferably from about 0.930 to about 1.040 g/cm$^3$, most preferably from about 0.930 to about 1.030 g/cm$^3$. The molecular weight distribution, $M_w/M_n$, is generally from about 1.5 to about 20, preferably from about 1.8 to about 10, more preferably from about 2 to about 5.

Thermoplastic polymers useful in the present invention also include alkenyl aromatic polymers. The alkenyl aromatic polymers may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 weight percent and preferably greater than 10 weight percent alkenyl aromatic monomeric units. Most preferably, the alkenyl aromatic polymer material is comprised entirely of alkenyl aromatic monomeric units.

Suitable alkenyl aromatic polymers include homopolymers and copolymers derived from alkenyl aromatic compounds such as styrene, alpha-methylstyrene, ethylstyrene, vinyl benzene, vinyl toluene, chlorostyrene, and bromostyrene, t-butyl styrene, including all isomers of these compounds. Suitable polymers also include alkenyl aromatic polymers having a high degree of syndiotactic configuration. A preferred alkenyl aromatic polymer is polystyrene. Minor amounts of monoethylenically unsaturated compounds such as $C_2$–$C_6$ alkyl acids and esters, ionomeric derivatives, and $C_4$–$C_6$ dienes may be copolymerized with alkenyl aromatic compounds. Examples of copolymerizable compounds include acrylic acid, methacrylic acid, ethacrylic acid, maleic acid, iaconic acid, acrylonitrile, maleic anhydride, methyl acrylate, ethyl acrylate, isobutyl acrylate, n-butyl acrylate, methyl methacrylate, vinyl acetate and butadiene.

General purpose polystyrene is the most preferred alkenyl aromatic polymer material. The term "general purpose polystyrene" is defined in the Encyclopedia of Polymer Science and Engineering, Vol. 16, pp. 62–71, 1989. Such polystyrene is often called also referred to as crystal polystyrene or polystyrene homopolymer.

The monoalkenyl aromatic polymers may be suitably modified by rubbers to improve their impact properties. Examples of suitable rubbers are homopolymers of $C_4$–$C_6$ conjugated dienes, especially butadiene or isoprene; interpolymers of one or more alkenyl aromatic monomers, and one or more $C_4$–$C_6$ conjugated dienes; interpolymers of ethylene and propylene or ethylene, propylene and a non-conjugated diene, especially 1,6-hexadlene or ethylidene norbomene; homopolymers of $C_4$–$C_6$ alkyl acrylates; interpolymers of $C_4$–$C_6$ alkyl acrylates and an interpolymerizable comonomer, especially an alkenyl aromatic monomer or a $C_1$–$C_4$ alkyl methacrylate. Also included are graft polymers of the foregoing rubbery polymers wherein the graft polymer is an alkenyl aromatic polymer. A preferred alkenyl aromatic polymer for use in all of the foregoing rubbery polymers is styrene. A most preferred rubbery polymer is polybutadiene or a styrene/butadiene copolymer.

Impact modified alkenyl aromatic polymers are well known in the art and commercially available.

Suitable polymers to be employed as Component (A) also include alkenyl aromatic polymers having a high degree of syndiotactic configuration.

Preferred alkenyl aromatic polymers include polystyrene, syndiotactic polystyrene, rubber-modified high impact polystyrene, poly (vinyl-toluene), and poly(alpha-methylstyrene).

Thermoplastic polymers for use in the present invention also include melt-stable lactide polymers or poly(lactide). By "melt-stable" it is meant that the lactide polymer when subjected to melt-processing techniques adequately maintains its physical properties and does not generate by-products in sufficient quantity to foul or coat processing equipment. Lactide polymers are obtainable from lactic acid and may therefore also be referred to as PLA resins. Such lactide polymers are disclosed, for example, in U.S. Pat. No. 5,773,562, the disclosure of which is incorporated herein by reference in its entirety. Suitable PLA resins are supplied commercially by Cargill Dow under the designation Eco-PLA. Poly(lactide) offers the benefits of being a renewable resource material which may be obtained from corn and of being biodegradable (compostable). Thus, poly(lactide) may be disposed of in an environmentally sound fashion.

The poly(lactide) formulation may include a plasticizer. Suitable plasticizers and selection criteria are disclosed in U.S. Pat. No. 5,773,562 (column 14, line 35—column 15, line 28).

To improve certain properties of poly(lactide) it may be advantageous to blend a second polymer with the poly (lactide). Suitable "second polymers" and selection criteria are disclosed in U.S. Pat. No. 5,773,562 (column 7, lines 2147).

Suitable elastomers and block polymers include, for example, block copolymers such as styrene/butadiene (SB) block copolymers, styrene/ethylene-butene/styrene (SEBS) block polymers, styrene/ethylene-propylene/styrene (SEPS) block polymers, styrene/isoprene/styrene (SIS) block polymers, and styrene/butadiene/styrene (SBS) block polymers; polyester/polyether block polymers (e.g., HYTEL™); ethylene/propylene rubbers; and ethylene/propylene/diene (EPDM) elastomers. Preferred elastomers are vinyl aromatic/conjugated diene block polymers (e.g. SBS) that have been substantially hydrogenated; that is the block copolymer is characterized by each hydrogenated vinyl aromatic polymer block having a hydrogenation level of greater than 90 percent and each hydrogenated conjugated diene polymer block having a hydrogenation level of greater than 95 percent where hydrogenation converts unsaturated moieties into saturated moieties. Also, preferred block polymers have a higher ratio of rigid polymer blocks (e.g. vinyl aromatic polymer blocks) to rubber polymer blocks (e.g. conjugated diene polymer blocks).

Suitable thermoplastic phenoxy resins include polyhydroxyaminoether, polyhydroxyesterether or polyhydroxyether.

The polymers used in the present invention may be modified, for example, but not limited to, by typical grafting, hydrogenation, functionalizing, or other reactions well known to those skilled in the art.

The graft modification of polymers, particularly polyolefins, such as polyethylenes and polypropylenes, with various unsaturated monomomers is well known in the art. Such a modification renders an essentially nonpolar material compatible, at least to some limited extent, with a polar material. Graft modification of the polymers is advantageously accomplished by employing an organic compound containing at least one ethylenic unsaturation (e.g., at least one double bond), and at least one carbonyl group (—C═O). Representative of compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itatonic, crotonic, methyl crotonic and cinnamic acid and their anhydride, ester and salt derivatives, if any. Maleic anhydride is the preferred unsaturated organic compound containing at least one ethylenie unsaturation and at least one carbonyl group.

The unsaturated organic compound content of the grafted polymer is at least about 0.01 weight percent, and preferably at least about 0.05 weight percent, based on the combined weight of the polymer and the organic compound. The maximum amount of unsaturated organic compound content can vary to convenience, but typically it does not exceed about 10 weight percent, preferably it does not exceed about 5 weight percent, and more preferably it does not exceed about 2 weight percent. The unsaturated organic compound can be grafted to the polymer by any known technique. The graft-modified polymer may be blended with one or more other polymers, either grafted or ungrafted. For example, a graft modified ethylene-based or propylene-based polymer may be blended with one or more other polyolefins, either grafted or ungrafted, or with one or more polymers other than a polyolefin, either grafted or ungrafted.

The polymers may be sulfonated or chlorinated to provide functionalized derivatives according to established techniques. In addition or alternatively, the polymers may be modified by suitable chain-extending or cross-linking processes using e.g. a physical or a chemical method, including, but not limited to, peroxide-, silane-, sulfur-, radiation-, or azide-based cure systems. A more detailed description of the various cross-linking technologies is described in U.S. Pat. No. 5,869,591 and EP-A-778,852, the entire contents of both of which are herein incorporated by reference. Dual cure systems, which use a combination of heat, moisture cure and radiation steps, may be effectively employed. Dual cure systems are disclosed, for example, in EP-A-0 852 596, incorporated herein by reference. For instance, it may be desirable to employ peroxide crosslinking agents in conjunction with radiation, and sulfur-containing crosslinking agents in conjunction with silane crosslinking agents.

The present invention also provides a profile or molding, wherein the profile or molding, the thermoplastic polymeric material or both have been cured, irradiated, or crosslinked. Preferably, the cured, irradiated or crosslinked thermoplastic polymer is a polyolefin, more preferably a polyolefin as defined above, and most preferably an ethylene-based polymer. As used herein, "crosslinking" and "crosslinked" include partially crosslinking (crosslinked) as well as fully crosslinking (crosslinked), as long as the crosslinking results in a gel which is verifiable via ASTM D2765, Procedure A. The various cross-linking agents can be used alone, or in combination with one another.

Suitable heat-activated cross-linking agents include free radical initiators, preferably organic peroxides, more preferably those with one hour half lives at temperatures greater than 120° C. For example, suitable cross-linking agents are organic peroxides, such as 1,1-di-t-butyl peroxy-3,3,5-trimethylcyclohexane, dicumyl peroxide, 2,5-dimethyl-2,5-di(t-butyl peroxy) hexane, t-butyl-cumyl peroxide, α,α'-di (butyl peroxy)-diisopropyl benzene,di-t-butyl peroxide, and 2,5-dimethyl-2,5di-(t-butyl peroxy) hexyne. Dicumyl peroxide is the preferred agent. Additional teachings to organic peroxide cross-linking agents are seen in C. P. Park, Supra, pp. 198–204, which is incorporated herein by reference.

Alternatively, polymers may be crosslinked or cured by first grafting a silane onto the polymer backbone and thereafter subjecting or exposing the silane grafted polymer to water or atmospheric moisture. Preferably, the silane grafted polymer is subjected to or exposed to water or atmospheric moisture after a shaping or fabrication operation.

Suitable silanes for silane crosslinking of the polymer, e.g. the ethylene polymer, include those of the general formula

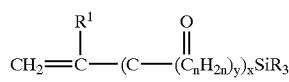

in which $R^1$ is a hydrogen atom or methyl group; x and y are 0 or 1 with the proviso that when x is 1, y is 1; n is an integer from 1 to 12 inclusive, preferably 1 to 4, and each R independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl.

Suitable silanes may be grafted to a suitable (ethylene) polymer by the use of a suitable quantity of organic peroxide, either before or during a shaping or fabrication operation. However, preferably, the silane is grafted onto the polymer before shaping or fabrication operations. In any case, the curing or crosslinking reaction takes place following the shaping or fabrication operation by reaction between the grafted silane groups and water. The water permeating into the bulk polymer from the atmosphere or from a water bath or "sauna". The phase of the process during which the crosslinks are created is commonly referred to as the "cure phase" and the process itself is commonly referred to as "curing".

Any silane that will effectively graft to and crosslink the polymer can be used in the present invention. Suitable silanes include unsaturated silanes that comprise an ethylenically unsaturated hydrocarbyl group, such as a vinyl, allyl, isopropenyl, butenyl, cyclohexenyl or γ-(meth) acryloxy altyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al., Vinyl trimethoxy silane, vinyl triethoxy silane, γ-(meth) acrytoxy propyl trimethoxy silane and mixtures of these silanes are the preferred silane crosslinkers for use in this invention. If a filler is present, then preferably the crosslinker includes vinyl triethoxy silane.

The amount of silane crosslinker used in the present invention can vary widely depending several factors such as the silane itself, processing conditions, grafting efficiency, organic peroxide selection, the ultimate application, and similar factors. However, typically at least 0.5, preferably at least 0.7, parts per hundred resin (phr) is used. Considerations of convenience and economy are usually the two principal limitations on the maximum amount of silane crosslinker used, and typically the maximum amount of silane crosslinker does not exceed 5, preferably it does not exceed 2, phr.

The silane crosslinker is grafted to the polymer by any conventional method, typically in the presence of a free radical initiator e.g. peroxides and azo compounds, or by ionizing radiation, etc. A suitable grafting method is disclosed in WO 95/29197, the disclosure of which is incorporated herein by reference.

But, for efficient silane grafting, organic initiators are preferred, such as an azo compound or any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy) hexane, lauryl peroxide, and tert-butyl peracetate. A suitable azo compound is azbisisobutyl nitrite. The amount of initiator can vary, but it is typically present in an amount of at least 0.04, preferably at least 0.06, phr. Typically, the initiator does not exceed 0.15, preferably it does not exceed about 0.10, phr. The ratio of silane crosslinker to initiator also can vary widely, but the typical crosslinker to initiator ratio is between 10 to 1 to 30 to 1, preferably between 18 to 1 and 24 to 1.

While any conventional method can be used to graft the silane crosslinker to the polymer, one preferred method is blending the two with the initiator in the first stage of a reactor extruder, such as a Buss kneader. The grafting conditions can vary, but the melt temperatures are typically between 160° C. and 260° C., preferably between 190° C. and 230° C., depending upon the residence time and the half life of the initiator.

Also suitable for the purpose of the present invention are moisture cure silane copolymers, such as ethylene-vinyl silane copolymers and ethylene vinyl acetate-vinyl silane polymers.

Crosslinking by irradiation may be accomplished by the use of high energy, ionizing electrons (electron beam), ultra violet rays, X-rays, gamma rays, beta particles, controlled thermal heating, or any combination thereof. Electron beam irradiation is preferred. Advantageously, electrons are employed up to 70 megarads dosages. The irradiation source can be any apparati known in the art such as an electron beam generator operating in a range of about 50 kilovolts to about 12 megavolts with a power output capable of supplying the desired dosage. The voltage of the electron beam generator can be adjusted to appropriate levels which may be, for example, 100,000, 300,000, 1,000,000 or 2,000,000 or 3,000,000 or 6,000,000 or higher or lower. In electron beam irradiation, the irradiation is usually carried out at a dosage between about 1 megarads to about 150 megarads, preferably between about 3 to about 50 megarads. Further, electron beam irradiation can be carried out conveniently at room temperature, although higher and lower temperatures, for example 0° C. to about 60° C., may also be employed. Furthermore, electron beam irradiation can be carried out in air atmosphere, or in reduced oxygen atmosphere or in inert gas atmosphere. Preferably, electron beam irradiation is carried out after shaping or fabrication of the article.

Also, in a preferred embodiment, a polyolefin is incorporated with a pro-rad additive and is subsequently irradiated with electron beam irradiation at about 8 to about 20 megarads. Suitable pro-rad additives are compounds which are not activated during normal fabrication or processing of the polymer, but are activated by the application of temperatures (heat) substantial above normal fabrication or processing temperatures or ionizing energy (or both) to effectuate some measurable gelation or preferably, substantial crosslinking.

Representative pro-rad additives include, but are not limited to, azo compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in the present invention are compounds which have poly-functional (i.e. at least two) moieties such as C=C, C=N or C=O.

At least one pro-rad additive can be introduced to the polymer by any method known in the art. But, preferably the pro-rad additive(s) is introduced via a masterbatch concentrate comprising the same or different base resin as the polymer. Preferably, the pro-rad additive concentration for the masterbatch is relatively high e.g., about 25 weight percent (based on the total weight of the concentrate).

Pro-rad additives are introduced to the polyolefin in any effective amount. Preferably, the at least one pro-rad additive introduction amount is from about 0.001 to about 5 weight percent, more preferably from about 0.005 to about 2.5 weight percent and most preferably from about 0.015 to about 1 weight percent based on the total weight of the polymer. Crosslinking can also be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and fin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention.

The catalyst (or mixture of catalysts) is present in a catalytic amount, typically between about 0.015 and about 0.035 phr.

The profile or molding of the invention may also comprise suitable mixtures, such as blends, of thermoplastic polymers. Polymer mixtures or compositions can be formed by any convenient method. If desired or required, compatibilization between two immiscible or incompatible polymers can be effected by a suitable compatibilizer. Preparing the compositions by physical admixture includes dry blending, melt-blending and solution blending, that is dissolving one or both of the components in a suitable solvent, such as for example a hydrocarbon, and combining the components followed by removing the solvent or solvents. Dry blending involves blending the individual components in solid particulate and subsequently melt mixing in a mixer or by mixing the components together directly in a mixer (for example, a Banbury mixer, a Haake mixer, a Brabender internal mixer, or a single or twin screw extruder including a compounding extruder and a side-arm extruder employed directly downstream of a interpolymerization process.

The mixtures can further be formed in-situ. For example, blends comprising a substantially linear ethylene interpolymer may be formed via interpolymerization of ethylene and the desired α-olefin using a constrained geometry catalyst in at least one reactor and a constrained geometry catalyst or a Ziegler-type catalyst in at least one other reactor. The reactors can be operated sequentially or in parallel. An exemplary in-situ interpolymerization process is disclosed in International Application WO 94/01052, incorporated herein by reference. The blends may be prepared using two reactors operated in series or in parallel, or by in-reactor blending using two or more catalysts in a single reactor or combinations of multiple catalysts and multiple reactors. The general principle of making polymer blends by in-reactor blending using two or more catalysts in a single reactor or combinations of multiple catalysts and multiple reactors is described in WO 93/13143, EP-A-0 619 827, and U.S. Pat. No. 3,914,362, each of which are incorporated herein by reference. The present polyolefin compositions can be prepared by selecting appropriate catalyst and process conditions with a view to the final composition characteristics.

Thermoplastic polymers suitable for use in the present invention also include recycled and scrap materials and diluent polymers (both encompassed by the expression "diluent materials"), to the extent that the desired performance properties are maintained. Exemplary diluent materials include, for example, elastomers, rubbers and anhydride modified polyethylenes (for example, polybutylene and maleic anhydride grafted LLDPE and HDPE) as well as high pressure polyethylenes such as, for example, low density polyethylene (LDPE), EM interpolymers, ethylene/vinyl acetate (EVA) interpolymers and ethylene/methacrylate (EMA) interpolymers, and combinations thereof. In some instances, it is preferable for a polymer mixture to contain less than 50 weight percent, more preferably less than 30 weight percent diluent material, particularly when the diluent material is a styrene copolymer, a styrene/butadiene rubber or a styrene/butadiene/styrene block copolymer (SBS).

Additives

Optionally, the profile or molding of the present invention may further comprise additives, including, but not limited to, antioxidants (e.g., hindered phenolics, such as IRGANOX™ or IRGANOX™ 1076 supplied by Ciba Specialty Chemicals), phosphites (e.g., IRGAFOS™ 168 also supplied by Ciba Specialty Chemicals), cling additives (e.g., polyisobutylene (PIB), SANDOSTAB PEPQ™ (supplied e.g. by Ciba Specialty Chemicals), pigments, colorants, deodorants, fillers, plasticizers, medical ornaments such as diaper rash ornaments, UV stabilizers, heat stabilizers, processing aid and combinations thereof.

Although generally not required, the profile or molding of the present invention may also contain additives to enhance antiblocking (antiblock agents) coefficient of friction characteristics (slip agents) including, but not limited to, untreated and treated silicon dioxide, talc, calcium carbonate, and day, as well as primary, secondary and substituted fatty acid amides, and combinations thereof. Still other additives, such as quaternary ammonium compounds alone or in combination with ethylene-acrylic acid (EM) copolymers or other functional polymers, may also be added to enhance the anti-static characteristics of the profile or molding of the invention. Enhanced anti-static characteristics promote the usefulness of the inventive profile or molding in, for example, cushioned packaging of electronically sensitive goods.

Profiles and Moldings

The profiles and moldings of the present invention are characterized in that they comprise at least one layer, which has a 'fringed' surface microstructure. In this document, a profile or molding, or a layer thereof having such fringed surface microstructure is also referred to as "fringed profile, molding or layer", including each item individually, e.g. "fringed profile". The fringed surface microstructure may cover a desired part or parts, or substantially the entire fringed item, depending on the desired design and intended use of said item.

The fringed surface microstructure is characterized by fringes. A fringe is defined as an at least partially hollow craterlike peaks, referred to as 'hollow fringe', or a substantially solid fiber-like aberration, referred to as 'solid fringe'.

When magnified, the side view of the fringed surface microstructure shows a broken up base consisting of a pattern of peaks or protrusions separated by troughs or valleys. For a microstructure composed of solid fringes, the base may be covered with fibrillar, strand-like or hairsike, spiky aberrations. Irregularly shaped, fine tentacles or fibrils are protruding from the peaks. A particular peak may carry one, two, three, four or more fringes. Peaks with several fringes may have a crown-like appearance. Solid fringes are substantially solid aberrations, e.g. as opposed to hollow or partially hollow protrusions. This means that the fringes are compact structures substantially entirely filled with and consisting of the thermoplastic material forming the fringed layer, possibly slightly grooved at the top.

A hollow fringe is a crater-like peak which is at least partially hollow at the top, meaning that at least about 25 percent of the volume at the top of the peak are empty or unfilled. "At least partially hollow" includes a completely hollow peak. Preferably, the peaks are non-perforated, meaning that preferably the base at the bottom of the craters is not perforated.

The base (of the fringe layer) and the fringes (themselves) are composed of the same thermoplastic polymeric material. The fringes are integral components of the layer forming the fringed surface microstructure.

The hollow fringes may have various three-dimensional structures. For example, they may approximate tubular or conical shapes. Various parameters can be used to characterize the geometry of the hollow fringes, such as the relation between different diameters. For example, the diameter at the bottom of the fringe may be larger, about the same, or smaller than the diameter at the tip of the fringe. Exemplary three-dimensional fringe structures mimic bottle-like or wine glass-like shapes. The side walls of the fringe typically become thinner towards the top of the crater. The brim at the top of the peak or crater may be (relatively) smooth, wave-like or fuzzy. The opening may be round or elliptical.

If the fringed microstructure of the profile or molding is not discernible with the naked eye, it is microscopically discernible, for example at an enlargement of about 10 times or more. For example, when appropriately magnified using Scanning Electron Microscopy (SEM), the top view of a fringed surface microstructure composed of hollow fringes exhibits a pattern of craters, for example a pattern of tubes or cylinders, which emerge from the base. The cross-sectional view, cutting through the center of the craters, exhibits peaks for the walls of the craters, followed by valleys which represent the crater holes as well as the surface of the base which is between the craters as dictated by the pattern of the base.

The fringed surface microstructure can be characterized by one or more quantitative parameters relating to the dimensions of the (overall) fringe, its (inner) hollow part, or both. Suitable parameters include fringe density, length or height (ratios), diameters, hollowness index or enhanced surface area, taken alone or in any combination. The fringed profile or molding of the invention may be designed to comprise substantially similar or different fringe structures.

Methods to determine the dimensional fringe parameters are known in the art, such as microscopy or optical surface profilometry.

In brief, suitable samples, such as cross-sections, of a fringed profile or molding may be analyzed by optical or electron microscopy, e.g. using microtoming. For a microstructure composed of hollow fringes, several cross-sections, for example 20 to 40, should be obtained such that the hollow center of a crater can be identified. Samples or cross-sections from items with relatively short fringes, e.g. with lengths below about 75 microns, are advantageously cut using an ultra-sharp, durable tool, such as a diamond knife, at very low temperatures, e.g. at −120° C. (minus 120 degrees Celsius). Cross-sections of Hems with longer fringes are embedded in a medium suitable for embedding tissue, such as Paraplast™ wax.

Optical surface profilometry is a method capable of profiling a rough surface having height variations. The method is performed with a non-contact optical profiler using vertical scanning interferometry (VSI) technology. Such profilers are commercially available, e.g. from ADE Phase Shift, or VEECO Methology Group, both in Tucson, Ariz., USA. Details on the method and the device are disclosed in an article by P. J. Caber et al., "New interferometric Profiler for Smooth and Rough Surfaces", Proc. SPIE, page 2088, October 1993, and U.S. Pat. Nos. 5,133,601; 5,204,734 or 5,355,211, all by D. K. Cohen and C. P. Brophy and incorporated herein by reference. Vertical scanning interferometry is characterized in that the interferometric objective moves vertically to scan the surface at varying heights. The source light beam is split within the interferometer. The beams reflected from the test surface and the reference surface recombine to form interference fringes. These interference fringes are the alternating light and dark bands which appear when the surface is in focus. The contrast of these interference fringes(or modulation) increases as the sample is translated into focus, then falls as it is translated past focus. As the system scans downward, an interference signal for each point on the surface is recorded. The interference fringe signal is then processed (demodulated) using a series of digital processing algorithms to calculate surface heights. From these heights and corresponding positions, a three-dimensional profile height function as well as two-dimensional cross-sectional views can be generated. The dimensional parameters used for fringe characterization are derivable from these structural data.

For the purpose of this invention, optical, non-contact profilometry is the preferred method to characterize the fringe structure and determine the dimensional parameters. This method has the advantage of being a non-destructive method, which does not require time-consuming sample preparation. The range of the surface height that can be profiled using this technique is 0.1 nm to 1 mm standard with less than 1% error. The method provides two-dimensional as well as three-dimensional structural data enabling the determination of several parameters with one measurement. The method utilizes a white light source. If a fringed surface microstructure is composed of fringes with a structure which is unsuitable to be measured by profilometry, the dimensional parameters are measured via optical or scanning electron microscopy.

The optical profilometry measurement can generate directly a number of surface microstructure data, such as the surface area ratio, the arithmetic average roughness, the average maximum peak-to-valley value and the average spacing of roughness peaks. The surface area is the total of the exposed three-dimensional surface area being analyzed, including peaks and valleys. The lateral surface area is the surface area measured in the lateral direction. The surface area ratio is calculated as the ratio of the surface area divided by the lateral surface area. The arithmetic average roughness, designated as Ra in surface metrology, is the arithmetic mean height relative to the reference mean plane. The reference mean plane is the three-dimensional reference surface to which all points in the dataset are related. The Ra value is calculated as:

$$Ra = \frac{1}{MN}\sum_{j=1}^{M}\sum_{i=1}^{N}|Z_{ji}|$$

For the purpose of the present invention, the Ra values relate to the total volume of fringes when the base of the film is selected as the reference mean plane.

The average maximum peak-to-valley value is the average maximum peak-to-valley height over the evaluation area, which is calculated as the average of each maximum peak-to-valley height of the measured data array. The average maximum peak-to-valley height Rz, is calculated as $$Rz = \frac{1}{N}\sum_{i=1}^{N}(Hi - Li),$$

wherein Hi are the highest points and Li are the lowest points found in the data array, and N is the number of data arrays within the dataset (evaluation area). The peak-to-valley value is the height difference between adjacent peaks and valleys. For the purpose of the present invention, the average maximum peak-to-valley height corresponds to the fringe length or height (H).

The density of individual fringes is at least about 1000 per square centimeter ($cm^2$), preferably at least about $2000/cm^2$. Preferably, the density is less than 10,000 per square centimeter. Most preferably, the density is in the range of from about 2000 to about 5000 fringes per $cm^2$. If desired, the fringe density may be selected to vary within the fringed surface microstructure, for example in a range from about 500 to 3500 per $cm^2$, preferably from about 1000 to 2000 fringes per $cm^2$. In another embodiment of the fringed microstructure, areas with fringes may be arranged next to areas without fringes, for example in a regular pattern. These areas may cover one to several square centimeters.

Fringe density can be determined by optical or electron microscopy, or surface profilometry.

FIG. 1 shows a cross-sectional view of an exemplary hollow fringe (2) which is integral with the layer forming the fringes (1) and has a tubular shape. (3) indicates the (total) length of the fringe (H), (4) indicates the depth of the hollow center or inner height ($H_h$), (5) is the diameter at the bottom of the fringe (D), and (6) is the (inner) diameter of the hollow center ($D_{1/2}$) at half height ($H_h/2$) (7).

As used herein, the fringe length or height (H) is the average maximum (vertical) distance between a (base) valley adjacent to the fringe whose height is determined and the tip of said fringe. It is readily apparent that the height should be determined on fringes in their most possible upright or vertical position, rather than on bent over or down-lying fringes. A hollow fringe may be higher on one side. The fringes should have a minimum height of at is least about 40 micrometers (microns) or more, preferably of at least about 80 microns or more, most preferably of at least about 150 microns or more. Typically, the fringe height is less than about 1 millimeter, preferably less than 600 microns. Most preferably, the fringe height is in the range of from about 200 to about 400 microns.

The particular geometry of the fringes, in particular the hollow fringes, can further be characterized in terms of the depth or height and diameter of the inner hollow part. These parameters can be put in relation with the overall fringe dimensions.

The values for $H_h$, D and $D_{1/2}$ can be calculated from the profile height function as determined by optical surface profilometry. These structural parameters can also be measured from the two-dimensional cross-sectional view of the fringe structure when the cross-section is dissecting the center of the hollow fringes as schematically illustrated in FIG. 1.

The hollow depth ratio (δ) is defined as the ratio of the average inner height or average depth of the hollow center ($H_h$) to the average (maximum) height of the fringe (H) (δ=$H_h$/H). The depth of the hollow center ($H_h$) may exceed the (outer) height (H) of the fringe, yielding a hollow depth ratio (δ) of more than 1. For a hollow fringe, preferably, δ is below 1.3, more preferably below 1.2.

The hollow diameter ratio (ε) is defined as the ratio of the diameter of the hollow center at half (inner) height ($D_{1/2}$) and the diameter at the bottom of the fringe (D) (ε=$D_{1/2}$/D). The diameter at the bottom of the fringe (D) is determined at the point of inflection at which the vertical portion of the fringe starts. While the ratio may be higher than 1, fringe structures with values of about 1 or lower are preferred. At least partially hollow craters have a hollow diameter ratio of at least about 0.1 or higher. In case the hollow diameter ratio is higher than 1, the measurements should be determined by optical microscopy.

The hollow depth ratio (δ) and the hollow diameter ratio (ε) are used to calculate the Hollowness Index (X). The Hollowness Index is indicative of the degree of hollowness, or the unfilled volume at the top of the fringe. The Hollowness Index (X) is calculated by multiplying the hollow depth ratio (δ) with the hollow diameter ratio (ε) (X=δ×ε×100= $H_h$/H×$D_{1/2}$/D×100). For a hollow fringe as defined herein, the Hollowness Index (X) is typically about 15 or higher, preferably about 25 or higher, more about 40 or higher. The Hollowness Index may be more than 100 (e.g., in case (ε) is higher than 1). The Hollowness Index should be below 260, preferably below 130 preferably, more preferably the index is 100 or lower, most preferably about 90 or lower. For the purpose of the present invention, fringes having a Hollowness Index of 100 or higher are considered as being completely hollow.

Another parameter suitable to characterize the fringe structure is the total surface area which depends on the fringe height (H), the hollowness, the diameters (D and $D_{1/2}$) and the density of the fringes. The Surface Area Ratio can be obtained by optical surface profilometry. Generally and as evident from FIG. 1, an at least partially hollow fringe according to the present invention has a greater surface area than a corresponding solid fringe (having the same outside geometric dimension).

Another parameter useful to characterize the fringe structure is the aspect ratio (A). The aspect ratio (A) is the ratio of the fringe height (H) and the fringe diameter (D) (A=H/D). Preferably, the fringes have an aspect ratio of at least about 1. The aspect ration for hollow fringes is preferably between about 1 and about 5, most preferably between about 1 and 3.

Another parameter characterizing the fringed surface microstructure is the center-to-center distance between two adjacent fringes. Preferably, the center-to-center distance is from about 100 to about 300 microns.

The particular three-dimensional fringed surface configuration characterizing at least one layer of the profile or molding according to the present invention may be obtained starting from a suitable precursor profile or molding. The structure of said precursor is characterized by a distinct surface texture consisting in a pattern of different (surface) thicknesses, i.e. areas of reduced thickness (valleys or troughs) and areas of greater thickness (peaks or protrusions). Advantageously, this pattern is predetermined and may be irregular or regular.

Alternatively, the precursor may be a foamed structure, e.g. a profile or molding having a foamed surface layer. In such case, the precursor protrusions are formed by the microbubbles of the foam. In the following, a profile or molding characterized by such pattern of different surface thicknesses and suitable to give a fringed surface microstructure according to the present invention will be referred to as "precursor" (profile or molding). This includes a profile or molding which in part is characterized by such pattern of different surface thicknesses.

To obtain the fringed surface microstructure the precursor surface is mechanically treated such that the protrusions are essentially longitudinally extended. Preferably, such longitudinal extension or stretching of the precursor protrusions is the result of treatment using mechanical means, such as a mechanical pulling force and/or an abrasive device.

The mechanical treatment of the precursor profile or molding is preferably performed in an in-line process, meaning that formation of the precursor structure and the fringed surface microstructure occur in a single continuous process. Such inline process involves a matrix surface suitable to create a surface texture and comprises formation of the precursor profile or molding on the matrix surface and subsequent formation of the fringed surface microstructure when the profile or molding is pulled off the matrix surface under certain conditions.

The matrix surface presents a negative or reverse approximation with respect to the desired surface texture of the precursor such that the thermoplastic material closely contacts said reverse structure under pressure. The negative structure may, for example, consist of very fine cavities. The cavities may have various geometries—primary variables include cavity dimensions (diameter, depth), shape and entry angle (with respect to the matrix surface). In such a process, mechanical treatment advantageously resulting in the longitudinal extension of the precursor protrusion occurs during the removal or peel-off of the precursor profile or molding from the matrix surface by exerting on the protrusions a tractive force at a certain angle. Appropriate control and defined conditions for the mechanical treatment are essential to make a fringed surface microstructure according to the present invention.

Mechanical post-treatment of the thus obtained fringed profile or molding, for example with an abrasive material, is optional, but may be desired to enhance fringed surface characteristics and properties. The additional mechanical deformation by means of an abrading device should affect, for example, the fringe length and/or the texture of the fringe tips.

For example, suitable equipment for a continuous compression molding process to make a fringed profile comprises a set of surfaces, as presented for example by a pair of rollers, preferentially enabling temperature control, with defined surface qualities. The surfaces may have different, similar or equal surface roughness and shape. The surfaces may be part of the primary equipment used to make the (base) profile, or, preferably, be installed for a secondary (separate) compression molding process. At least one surface, referred to as matrix surface, is characterized by the presence of numerous cavities with a projected area of at least about 1000 square microns and a depth of at least about 100 microns. The number or density of cavities should correspond to the desired fringe number or density. Such matrix surface structure can be provided by a porous material, an open cell, foamed material, by woven or entangled fibrous structures (e.g., natural, metallic, polymeric), by sintering of a suitable material, such as metallic, ceramic, polymeric or natural particles, or fibrous materials, by mechanical or chemical treatment of a suitable material, or preferably by eroding techniques (electrical, chemical, lasering). Such matrix surface is applied on a device suitable for processing a profile or molding. Preferably, the cavities are substantially regular or symmetrical.

Preferred matrix surfaces are steel, silicon, a rubber, e.g. covering an appropriate support, such as a steel core, a polymer, e.g. coated on an appropriate support, such as a steel, or a ceramic, e.g. on an appropriate support, such as steel. Particularly preferred matrix surfaces are silicon or rubber, advantageously having a Shore A hardness in the range of about 70 to about 85, preferably a halogen-elastomer, such as a fluoroelastomer. Advantageously, the matrix surface is lasered with fine cavities having or approximating the form of cylinders. Suitable techniques and technologies to make the matrix surface and the cavities are known in the art. The matrix surface is applied on a device suitable for processing a profile or molding, such as a roller, a belt, or a mold. Typically, for symmetrical cavities, such as cylinder-like cavities, the angle of incline of the axis of symmetry of the cylinder relative to the matrix surface is in the range of from about 45 degrees to about 90 degrees, preferably 90 degrees.

To prepare the desired precursor having a pattern of different surface thicknesses a polymer mass, e.g. in the form of a polymer melt, polymer dispersion, polymer suspension, polymer solution, profile or molding is applied on the matrix surface. Advantageously and preferably, the polymer mass is applied in form of a semi-finished product, in particular in the form of a profile. If desired, lamination (to that surface of the semi-finished product which is not facing the matrix surface) may be accomplished simultaneously with the continuous compression molding step. One or more counter surfaces suitable to apply pressure onto the polymer mass, such as a roller or a belt, is used to force the polymer mass into the cavities of the matrix surface. Preferably, penetration of the polymer mass into the cavities is facilitated by heating the surface of the mass to a temperature which is close to, preferably above the melting point of the polymer forming the protrusions. Generally, the person of ordinary skill in the art is readily able to select the appropriate temperature. The surface of the polymer mass is molded such that individual, distinct surface elevations or protrusions are formed in the cavities, thus yielding a suitable precursor structure. At the same time, the other surface of the polymer mass is shaped according to the structure of the counter surface of the pressuring device. The surfaces of the precursor reflect the surface characteristics of surfaces, e.g. both rolls, the pressure roll or belt and the matrix roll or belt. Key parameters during formation of the precursor are roll or belt pressure and temperature (of the polymer mass surface and the relevant equipment). Low(er) viscosity of the polymer is preferred. After the surface molding, the profile or molding is released or pulled off from the matrix surface, which step requires sufficient (tensile) strength to pull the molded elevations out of the cavities. Sufficient strength is achieved by appropriately cooling the precursor, if desired using additional external cooling sources, such as an air knife or cooling water. Preferably, the thermoplastic material is not solidified, when the fringe-forming force is applied and the profile is stripped off the matrix surface. Most preferably, thermoplastic material is in the semi-molten state when the profile or molding is stripped off the matrix roll or belt. Advantageously, the profile is cooled such that the thermoplastic material forming the fringes has a temperature which is about at or advantageously below the Vicat point. If the polymer mass fed into the compression molding equipment is a suspension or emulsion (additional) drying and/or curing and/or cross-linking may be performed on the matrix roller or belt, optionally in the presence of additional sources of energy for curing or crosslinking after the surface molding has occurred.

During the release process of the precursor from the matrix surface, the protrusions characterizing the precursor surface are preferably elongated to give the fringed surface microstructure. Thus the mechanical treatment of the precursor providing deformation of the protrusions involves subjecting the precursor and the protrusions to a tractive force. The tractive force is dependent on adhesion or interaction between the polymer comprising the fringe layer and the matrix roll or belt surface and the release angle.

A crucial parameter in this step of mechanical treatment is the release angle, that is the angle between the fringed profile during the release process and the matrix surface. In this context matrix surface means that part of the device which is free and no more covered with the profile. In case the matrix surface is (on) a roller, the release angle is the angle between the fringed profile and the tangent through the point of release. The release angle should be greater than 10, preferably greater than about 20 degrees, more preferably at least about 45 degrees and most preferably at least about 90 degrees. The release angle should be less than about 170 degrees. The release angle is impacted by the angle of the cavities in relation to the surface. The temperature at the polymer surface should be above lo the glass transition temperature and below the crystalline melting point of the polymer forming the protrusions. Release angle, take-off speed and polymer surface temperature are selected such as to further extend the protrusions of the precursor, thus still further increasing the surface area in respect to the precursor structure.

A preferred process to make a fringed profile of the present invention is a roller- or belt based continuous compression molding process. Such process comprises a (cavity) filling step and a release or peel-off step, both of which affect fringe formation. In the preferred process, the matrix roll or belt is in contact with a pre-heat or counter roll or belt, forming a nip. The nip width depends upon the compression of either or both of the counter (or preheat) roll or belt and the matrix roll or belt at the temperature and pressure applied. The linear compression distance at the center (axis) of the rolls is the negative gap. The pressure in the nip can be measured according to methods known in the art. The arrangement of the rolls may be vertical or horizontal.

The temperature of the particular polymer layer coming in contact with the matrix roll or belt preferably is at or above the melt temperature of the polymer when it leaves the nip contact width. For blends, the temperature should be such that the majority to all of the polymer is molten. Critical variables in the 'filling step', i.e. in the filling of the matrix cavities, which affects fringe formation include polymer type, and (its response to) line speed, temperature in the nip, and pressure in the nip. Advantageously, these variables are measured and/or controlled using conventional methods known in the art. For example, nip contact pressure can be measured using commercially available pressure measuring film, e.g. Fuji Prescale Film. Maximum nip pressure measured at the center of the nip width in line with the center of the roll axis should be at least about 1 MPa, or higher. The gap between the two rolls or belts should be negative. Another critical parameter is the interaction of the polymer and the matrix roll or belt surface. The polymer should have sufficient wettability to the matrix roll or belt. The filling step yields the precursor which is then cooled as it travels along the matrix roll or belt. Optionally, a device supporting cooling of the profile on the matrix roll or bell, such as an air knife may also be present. Such device serves to facilitate the removal of the profile from the matrix roll or belt, or to increase production speed. The amount of force/tension required to peel the profile from the matrix roll for a given fringe layer polymer is dependent upon the adhesion of the polymer to the matrix roll or belt surface (which is a function of the composition of the matrix roll surface and the polymer, and their temperatures), and the release or peel angle.

The greater the adhesion, typically the higher the resulting peel angle. For hollow fringe formation, it is important to optimize the adhesion, line speed and the strength of the precursor so that a maximum amount of draw or elongation of the fringe layer polymer is obtained, while ensuring that the polymer is completely removed from the cavity due to an adhesive peel (or controlled adhesive failure) between the polymer and the matrix surface. This results in hollow fringe formation with optimized fringed length. For solid fringe is formation, the temperature of the fringe layer should be at or above the Vicat softening point. The fringe layer temperature and line speed should be adjusted to achieve minimal to no drawing of the polymer during removal, and minimal to no adhesion to the cavity walls.

For those profiles for which rollers are unsuitable, a caterpillar haul-off unit with the shape of the profile is used. The inner surface of the haul-off represents the matrix surface. The forming pressure can be applied from the inside of the profile by means of a mechanical or pneumatic device, or a vacuum on the outside, or combinations thereof.

The above-described continuous process combining compression molding and mechanical treatment can be modified to produce a fringed molding. A mold cavity is filled with a molten polymer mass or a polymer emulsion or suspension which is then shaped by application of pressure, the matrix surface being formed by suitable cavities (e.g. borings) in the inner surface of the mold, or suitable inserts therein in case the fringed surface microstructure is desired only on parts of the molding. The fringed molding may be produced using injection molding, including co-injection molding, blow molding, injection blow molding, injection stretch blow molding or rotomolding technology.

The pressure to force the polymer mass into the cavities is applied via the injection and/or holding pressure in the case of injection molding. For blow, injection blow molding or injection stretch blow molding the pressure is applied via the forming pressure; in rotomolding pressurized molds are used. For molding technologies where a dipping process is used, electrostatical forces can be used for filling of the cavities. The fringed surface microstructure is generated during the demolding process which advantageously affords stretching of the protrusions created in the matrix surface cavities. The 'fringing effect' is impacted by the release angle, which in this case is the angle of the cavities relative to the mold surface, the shape of the molding and the demolding process and technology. Further parameters affecting the fringing effect are the filling time, holding pressure, holding time, temperature of the molten polymer forming the fringed layer and the mold surface temperature.

Optionally, the fringed surface microstructure of the molding may be further enhanced by further mechanical treatment, e.g. using an abrasive device.

To facilitate release of the profile or molding, it may be desirable to use demolding agents as known in the art, such as silicon spray or coating.

Advantageously and preferably, the thermoplastic polymer or polymer blend forming the fringed surface microstructure is selected such that the fringes (after formation) are dimensionally stable, resilient and resistant to deformation under load at ambient temperature. Generally, polymer selection will be dictated by the particular process conditions for making the precursor and the fringed surface and the specific performance requirements of the envisaged end-use applications. Optimal filling of the cavities with the polymer is favored by employing a thermoplastic having a low viscosity at the relevant processing temperature.

Preferred polymers for use in the fringed layer obtainable by the above-described process combining optimal filling in the continuous compression molding processs and mechanical treatment by application of a tractive force are polyolefins more preferably ethylene-based polyolefins, including homogeneous ethylene-based polymers and heterogeneous ethylene-based polymers, such as Ziegler/Natta polymers having a density in the range of about 0.900 g/cm$^3$ to about 0.960 g/cm$^3$ (e.g. DOWLEX™ or ATTANE™ copolymers available from The Dow Chemical Company), or polymers produced via high pressure processes.

Mechanical treatment to create the fringed microstructure on the profile or molding may consist in treatment relying on the principle of friction, for example treatment with an abrading device. Preferably, such treatment is applied to a foamed profile or molding to create a fringed surface microstructure. Optionally, the fringed profile or molding produced in a molding process may be subjected to mechanical post-treatment, such as treatment relying on the principle of friction, for example treatment with an abrasive device. Preferably, the abrasive device has a harder surface or surface coating than the polymer surface to be treated. Suitable abrasives include, but are not limited to, sandpaper or sand-paper type materials, brushes, steel wool, or abrasive fabrics, such as a fleece or a non-woven having the required surface hardness. Suitable materials for the brush are, for example, nylon, glass-fiber or metal wire, such as bronze. It is readily apparent to the person skilled in the art that the length of the fringes is affected by the type of abrasion material and the particular technique of treatment therewith. Critical parameters include deforming speed, applied pressure, temperature, particularly the polymer surface temperature, and hardness (difference). Advantageously, the treatment is such that the fringed surface structure is enhanced, e.g. the fringe structure is elongated and the tips may become frayed. Best results are obtained by circular, oscillating or linear movements, or any combination thereof. The general direction of these movements relative to the fringed surface and surface orientation may be longitudinal, transverse, angled, or any combination thereof. If the treatment is essentially unidirectional, it is preferred to have at least two consecutive steps of either unidirectional or angled treatment. In the case of rotational or oscillating treatment, sequential treatment steps can improve the final quality of the surface. For each combination of surface hardnesses, i.e. surface hardness of the abrasion material and surface hardness of the polymer surface, exists an optimum type of movement and speed to obtain a particular fringed surface microstructure, e.g. fringe length and Hollowness Index. Such optimization is within routine experimentation. When magnified, e.g. using the SEM technique, the tops of the walls of the craters may be seen to be frayed, torn and elongated.

One or more layers of the profile, or the molding may be expanded, for example with a conventional blowing agent, to make a foamed profile or molding. To make foamed profile structures or layers, either physical or chemical blowing agents may be used to achieve suitable foam densities, e.g. foam densities from 1 g/cm$^3$ to as low as 0.01 g/cm$^3$. Suitable blowing agents are known in the art. The foams may be open or closed cell, according to ASTM D2856. The cell sizes of the foams typically are from about 0.01 mm to about 5.0 mm, preferably from about 0.02 to about 2.0 mm. The foams may be crosslinked or non-crosslinked.

Fringed profiles or moldings, and articles of manufacture comprising such fringed profile or molding particularly benefit from the fringed surface microstructure. Performance attributes which can be specifically provided or enhanced by the fringed surface microstructure include soft, velvety and textile-like feel or touch, matte appearance, liquid repellency, anti-skid and good grip properties, surface variability and surface imprintability, controlled release properties, storage capabilities, and protective properties. Depending on the intended end-use application the fringed surface microstructure can be designed and optimized to specifically exploit or favor one or more of these performance attributes, for example by selection of a proper polymer material or polymer materials, and/or of a proper fringe structure. If desired or required, the fringed profile or molding may be made to have additional functional properties, such as increased heat resistance, or barrier properties.

The present invention also relates to an article of manufacture made from or comprising a fringed profile or molding. Based on the specific advantageous performance attributes afforded by the fringed surface microstructure such articles of manufacture are useful, for example, for decoration or as decorative materials, for packaging or as packaging material, in automotive applications, for industrial, personal or medical hygiene applications, and for household applications.

More specifically, the fringed surface microstructure characterizing the articles of the invention affords an excellent soft, velvety and textile-like feel or touch, The fringed profile or molding of the present invention has improved haptics and is very pleasant and easy on a person's skin. Based on this property such fringed profile or molding is useful to manufacture plastic based articles for which such improved haptics are desirable, e.g. plastic articles of manufacture used in soft touch, soft feel applications. For example, soft touch, soft feel materials are desirable for toys, in the automotive industry, for example on automotive interior surfaces, including but not limited to instrument panels, consoles, door panels, head rests, and steering wheels. The fringed profiles or moldings according to the invention are also useful to make decorative articles with (direct) skin contact, for example, furniture surfaces including outdoor furnishing, medicinal and personal hygienic articles, including, for example, condoms, grips; (bag) handles; luggage, bags or handbags, or shoes; gloves, and protective gear, e.g. helmets, industrial hygienic articles, such as disposable toilet seats and head rests, and the like. For end-use applications requiring a soft feel the fringe length is advantageously at least about 150 microns or more. Generally, use of polymers having a low modulus polymer will be advantageous to obtain a soft feel. The use of polymers having a higher modulus will result in differentiated haptics and tacticity, affording a (relatively) rough feel rather than a soft feel. Such articles can be useful as scouring or abrading devices, or to provide anti-skid performance.

Another benefit provided by the fringed surface microstructure characterizing the profile or molding according to the invention is a matte (mat) appearance and further reduced gloss (relative to the precursor). Gloss is determined according to ASTM D-2457. The profiles or moldings according to the invention are useful to manufacture articles relying on excellent aesthetics and matte optical appearance including, for example, decorative articles, artificial flowers; jewelry boxes and luggage.

Another advantageous property characterizing the fringed profile or molding is a differentiated surface tension, as determined by the test methods according to ASTM D-2578 or DIN 53364, and water contact angle. The fringed profiles or moldings of the invention are useful for applications and articles where surface water or liquid drain management such that water beads up and drains off, is required.

Furthermore, the fringed surface microstructure also provides a frictional behavior, as reflected e.g. in the dynamic coefficient of friction, which affords anti-slip or anti-skid and better grip performance attributes to a fringed profile or molding, or an article of manufacture with a surface made from or comprising a fringed profile or molding of the invention. The dynamic coefficient of friction of a particular fringed surface may be determined according to ISO 8295, relative to various surfaces of interest, including, for example, the same or a different fringed surface, or a glass, metal, ceramic or polyolefin surface. The fringed surface microstructure provided herein typically provides an increased coefficient of friction as compared to non-fringed (plain) profile or molding of the same composition. The better grip and anti-slip properties make the fringed profile or molding of the invention useful for a variety of applications and articles including, but not limited to bottles, handles, grips, cups, floor cover mats, furniture, gloves, bathroom articles, such as shower shoes and shower mats, truck beds, boxes, and serving trays (e.g. as used in air planes or restaurants).

The process for making gloves or condoms comprises dipping the suitable form into a suitable dispersion, such as latex. The forms are cleaned, rinsed and dried. Subsequently, the forms are heated and a coagulant for the latex is added to support curing of the latex. The latex is applied to the forms by dipping the forms into the latex bath. Before the product is cured any undesirable solvents or materials are allowed to leach out during a leaching step. The gloves or condoms may be removed from the form by blasting them off by air, which is rather difficult to accomplish, or by peeling the latex off the form while inverting it at the same time. Prior to the curing or leaching steps the gloves or condoms-maybe dipped into a bath for coating with another material. For example, the coating may serve to enhance grippage, increase the glove wearer's ability to hold onto slippery or wet instruments or improve the feel against a person's skin. The peel/inversion process to remove the gloves from the form is applied such as to give the fringed surface microstructure. Thus the secondary dipping step of the conventional process becomes redundant.

Another benefit afforded by the fringed surface microstructure is surface variability, particularly surface printability or imprintability (embossing), as reflected in the possibility to create distinct areas of different topography, e.g. using suitable impression techniques. The fringed surface may be (im)printed with or without ink. Printability may be evaluated in terms of ink adhesion, color density (vividness), print definition employing suitable methods known in the art, including for example adhesive tape peel tests, abrasion tests, or simply visual appearance. The ink may reside inside and/or between the fringes as well as at the tips or sides of the fringe. Acceptable ink adhesion is possible for water based and solvent based inks and should be selected based on the fringe layer polymer. Color density may vary dependent on the angle of view thus creating a unique 3D-type appearance. Clear fringed profile or molding may be reverse printed, e.g. by printing the fringed microstructure and viewing from the reverse side.

Using, for example, a hot stamp, hot air or friction to re-melt and/or compress part of the fringes in a selected regular or irregular pattern to form a smooth surface, haptic and/or optic effects are achieved by the resulting difference in surface structure and appearance. Thus printing effects may be obtained without the need for color or ink. If the difference in surface structure is marked, it may also be noticeable by a person with reduced visual ability or a blind person. Nevertheless, color or ink may be added to enhance the effects.

The desired imprinting effects may be realized relying on the same principles used in printing or sealing. For example, a stencil or print negative which is a metal or thermoset material that can be heated without distortion to temperatures above the melting point of the thermoplastic polymer forming the fringes may be employed. Suitable temperatures for polyethylene are in the range of from about 50° C. to about 200° C., preferably from about 60° C. to about 160° C., more preferably from about 70° C. to about 120° C. The image or pattern of the stencil or print negative is applied by pressing it on the fringed surface such that a three-dimensional effect is obtained. The effects are also obtainable in a process which does not involve contacting the fringed surface, e.g. by applying a jet of hot effluent (e.g. air) similar to an air brushing printing process. Another process suitable to obtain imprinting effects is to abrade the fringes on the surface by a mechanical process and thus create areas of differentiated topography resulting in print-like images. Alternatively, to obtain the described effects, the fringed surface may be created only on parts of the basic profile or molding 'a priori'.

The fringed surface microstructure can be printed with ink and resist ink from being scratched or abraded, thus enhancing the durability and appearance of the fringed article or item. The benefit of enhanced abrasion and scratch resistance is also afforded to coatings, such as barrier coatings, or metallization. By making the (barrier) coatings or deposits more scratch and abrasion resistant their particular properties will be maintained for a longer period of time. The advantage of improved scratch resistance also applies to printed or painted surfaces, e.g. in an automobile, such as dash boards, instrument panels etc., metallized profiles or moldings, e.g. used in the packaging of food, medical items or electronics, and barrier coated articles.

Based on its surface variability and/or imprintability the fringed profile or molding of the present invention is particularly useful to make drinking cups, bottles, articles suitable for advertising, and party articles.

The increased surface area of the fringed profile or molding of the invention affords enhanced carrying, capturing or storing properties, which can be exploited for numerous applications and articles, including but not limited to articles comprising a controlled release system. For example, such system may provide for the controlled release of antibiotics or fungizides, the controlled release of fragrances or the controlled release of drugs. Enhanced carrying, capturing or storage properties can also be exploited in carrier substrates for catalysis, filtration media, for HF weldability, thermal insulation, and packaging. Craters which are at least partially hollow provide a greatly enhanced surface area (e.g. as compared to a filled protrusion). The hollow tube structure has an outside surface, an inside surface, as well as the surface between the hollow tubes. The craters are suitable reservoir structures, which other substances can be embedded into or coated onto. Such reservoir structures allow, for example, the gradual diffusion or the controlled release of substances, such as drugs, pesticides, herbicides, fungicides or fragrances. Such reservoir structures are useful e.g. in packaging, storage or filtration systems. A porous membrane may be put over the top of the reservoirs to release to the environment. If a barrier, for example made from SARAN™ or EVOH resin, is coated over the top of the reservoirs and the base of the profile or molding is made from a porous material the substance is delivered through the base polymer. Antibacterial agents can be placed on the surface to prevent mold and mildew formation. Placing a static charge on the surface further enhances the ability to pick up substances, such as dirt or dust.

Furthermore, absorbent materials can be coated onto the fringed surface or be incorporated into the polymer (as a type of filler) before the fringed profile or molding is made, for example in order to enhance the absorption of coatings or ink. Examples of suitable absorbent fillers include, for example, superabsorbents used in hygiene applications and mineral fillers.

The fringed profile or molding according to the invention may be made to be (moisture) vapor permeable or breathable according to methods known in the art.

The fringed profiles or moldings according to the invention are useful for packaging applications, e.g. packaging applications requiring enhanced protection, e.g. against scratching, or cushioning, and/or printability. Exemplary packaging applications include boxes, tubes and containers, e.g. for food, cosmetics, or electronics. Fringed profile or molding consisting of poly(lactide) acid are biodegradable and are particularly suitable for disposable articles.

The fringed profile or molding may be elastic. The elastic profile or molding of the invention comprises a material which is highly stretchable and which reverts to its original or nearly original form upon release of any pressure or force applied to the material. Elastic polymeric materials include, for example, AB and ABA block or graft copolymers (where A is a thermoplastic endblock such as, for example, a styrenic moiety and B is an elastomeric midblock derived, for example, from conjugated dienes or lower alkenes), chlorinated elastomers and rubbers, ethylene propylene diene monomer (EDPM) rubbers, ethylene-propylene rubbers, thermoplastic polyurethanes, ethylene-alpha olefin copolymers, specifically at a density less than 0.89 g/cc, and ethylene-styrene interpolymers with a styrene content of less than 40 weight percent. Blends of these polymers alone or with other modifying elastic or non-elastomeric materials are also contemplated being useful in the present invention. The low modulus of elastic polymers is also advantageous in terms of haptics.

In a post-treatment step, the fringed profile or molding according to the invention may be oriented according to methods known in the art.

If desired, the fringed profile or molding may be further treated (post treatment) and the surface characteristics of a fringed profile or molding maybe modified by techniques known in the art, including, for example, corona treatment. Corona treatment increases the polarity of the surface, thus increasing the wetting tension. The greater the polar component the more actively will the surface react with different polar interfaces.

One aspect of the present invention relates to a monolayer profile or molding, or articles of manufacture comprising such profile or molding, characterized by a fringed surface microstructure on one side, or on both sides. The fringed microstructure may cover parts of the surface, or the entire surface. Such mono-layer structure is preferably made from a suitable thermoplastic polymeric material indicated as being preferred herein-above. The mono-layer may be made from a single thermoplastic polymer, preferably an ethylene-based polymer, including for example a heterogeneously or, preferably, a homogeneously branched ethylene polymer, and a substantially random ethylene/styrene interpolymer, a polypropylene polymer, or a (poly)lactide, or a mixture or blend of thermoplastic polymers, preferably comprising the polymers indicated as being preferred. For example, a suitable polymer blend may be composed of two or more homogeneously branched ethylene-based polymers, or at least one homogeneously branched ethylene-based polymer and at least one heterogeneously branched polymer, or two or more heterogeneously branched polymers.

The present invention further provides a profile or molding comprising a thermoplastic polymeric material, wherein the profile or molding, the thermoplastic polymeric material or both have been cured, irradiated or cross-linked. Advantageously, curing, irradiation or crosslinking is performed after forming of the fringed surface microstructure. Preferably, the cured, irradiated or cross-linked thermoplastic polymer is a polyolefin, most preferably an ethylene (inter)polymer. Crosslinking is achieved using the methods and techniques described in more detail herein-above. Such profile or molding affords the benefit of enhanced heat resistance, as required, for example, by applications in the automotive industry, such as automotive interior applications, such as steering wheels, or articles with much exposure to the sun, such as outdoor furniture.

Generally, in a multi-layer profile or molding according to the invention, at least one layer has a fringed surface microstructure and is comprised of a thermoplastic polymer as defined herein. The fringed microstructure may be present on the entire surface, meaning the outer and inner surface, of the profile or molding, or at least a part of the surface, for example the outer surface, the inner surface, or areas therof. In a multi-layer structure, each layer will serve a particular function or provide some characteristic to the overall structure. The composition of these layers is chosen depending on the intended end use application, cost considerations, and the like.

For example, layers may serve to provide particular structural or functional characteristics, e.g. add bulk to the structure, promote interlayer adhesion, provide barrier properties, thermal properties, optic properties sealing characteristics, chemical resistance, mechanical properties, or abuse resistance. An adhesion promoting interlayer is also referred to as a tie layer. If a barrier layer is desired or required for the intended end use application, it is selected so as to meet the targeted degree of gas or moisture (im)permeability.

Various materials can be used for these layers, with some of them being used in one or more than one layer in the same film structure. Suitable materials include, for example, nylon, ethylene/vinyl alcohol (EVOH) copolymers, polyvinylidene chloride (PVDC), polyethylene terephtalate (PET), oriented polypropylene (OPP), ethylenelvinyl acetate (EVA) copolymers, ethylene/acrylic acid (EM) copolymers, ethylene/methacrylic acid (EMAA) copolymers, LLDPE, HDPE, LDPE, graft adhesive polymers, such as maleic anhydride grafted polyethylene.

For example, a gas barrier layer may be made from vinylidene chloride copolymer, EVOH copolymer or SARAN™.

Examples of thermoplastic polymers appropriate for use in the seal layer include LLDPE, ULDPE, VLDPE, POP, EVA copolymer, EAA copolymer and lonomers.

Thermoplastic polymers for use in the bulk layer are advantageously chosen based on cost considerations and include recycled materials. Representative polymers are, for example, LLDPE, such as ethylene/butene copolymers, LDPE, EVA copolymer, (recycled) HDPE, polypropylene polymers and blends thereof.

Examples of thermoplastic polymers appropriate for use in a layer providing advantageous mechanical properties include, for example, ethylene/$C_4$–$C_8$ copolymers. The fringed multi-layer structures according to the invention typically consist of from two to seven layers.

EXAMPLES

The following Examples are illustrative of the invention, but are not to be construed as limiting the scope thereof in any manner. The following abbreviations are used: ESI= substantially random ethylene/styrene interpolymer; MFI or MI=melt flow index (measured at 2.16 kg/190° C. according to ASTM D-1238, condition E); N/T=not tested; the pressures are indicated in MegaPascal (MPa) and the temperatures are in degree Celsius.

Example 1

Preparation of an Injection Molded Plaques

A) ENGAGE™ D-8913, available from DuPont Dow Elastomers, L.L.C., is used as thermoplastic material. The equipment consists of a conventional injection molding machine suitable for the polymer to be processed. A part of the inner surface of the mold contains 2500 microholes per square centimeter. The holes are round and 200 microns long. Variable parameters are: injection speed and pressure, holding pressure, mold temperature and mass temperature. During the injection process and the consecutive phase of holding pressure the polymer melt is pressed against the inner mold surface to create on the particular part of the mold a surface textured side with knobs of variable length (depending on the temperature of the mold, polymer mass and the injection and holding pressures). The surface textured side of this "precursor" molding is off-line scrubbed to enhance or generate the fringed surface microstructure. Using a particular set of process conditions (time and rate of cooling, ejection speed) a fringed surface microstructure is obtained without brushing.

B) An injection molded plaque is prepared from Dowlex® 2503 polyolefin resin (105 Ml, 0.926 g/cc density) by the reciprocating screw injection molding process. An Arburg 170 CMD injection molding machine is utilized in this example. The machine is equipped with an 18 mm diameter injection cylinder containing a general purpose screw and non-return valve, a spring loaded shut-off nozzle, and a mold having cavity dimensions of 5.1 cm×5.1 cm×0.69 cm (length×width×depth, L×W×D). The mold is fed by a cold sprue and a full thickness film gate (0.71 mm depth). A Viton elastomer having the dimensions of 5.1 cm×5.1 cm×0.53 cm (L×W×D) is inserted into the mold cavity. The viton elastomer (nominal 85 Shore A hardness) is obtained from interflex, Inc. (Spartanburg, S.C.), and it is laser engraved with holes having nominal dimensions of 110 micron×300 micron (diameter×depth) in a diamond pattern having an approximate aerial density of 2645 $cm^{-2}$, and center to center to center distance between cavities of either 204 microns (shortest distance) or 286 microns (furthest distance along diagonal). Relevant processing conditions are shown below. The injection molded articles are de-molded as bi-layer elastomer/polyolefin laminates, and are subsequently manually delaminated, as rapidly as possible, at a 45 degree diagonal. Delamination typically occurs at the right hand side nearest to the gate looking upstream from the sprue. Surface topology and morphology is determined by optical microscopy at the quadrant opposite to initial delamination. A partially hollow fringe is observed having the approximate fringe dimensions of 75×275 micron (diameter×length). Approximately 38% of the fringe length (105 micron) is hollow and 170 micron is solid.

| Process Conditions | |
|---|---|
| Barrel Temperature (° C.) | |
| Zone 1 | 204 |
| Zone 2 | 232 |
| Zone 3 | 232 |
| Nozzle | 232 |
| Hydraulic Oil Temperature (° C.) | 35 |
| Plasticization Speed (m-$min^{-1}$) | 10 |
| Backpressure (bar) | 10 |
| Dosage ($cm^3$) | 9.25 |
| Operating Mode | Semi Automatic under Velocity Control |
| Available Injection Pressure (bar) | 2500 |
| Fill Time (s) | 0.3 |
| Hold Pressure (bar) | 2500 |
| Hold Time (s) | |
| First Stage | 6 |
| Second Stage | 0 |
| Cooling (zero hold) | 0 |
| Mold Temperature (° C.) | |
| Fixed Platen | 53 |
| Moving Platen | 51 |

The dimensional parameters of the fringe, as determined by optical surface profilometry (using a WYKO NT3300 Optical Profiler and the Vertical Scanning lnteferometry (VSI), are as follows:

Fringe Height (H): 280 microns
Hollow Depth Ratio: 0.95
Hollow Diameter Ratio: 0.53
Hollowness Index: 50
Aspect Ratio: 2/8

C) An injection molded plaque is prepared from Dowlex™ 2503 polyolefin resin (105 Ml, 0.926 g-cc$^{-1}$ density) by the reciprocating screw injection molding process. An Arburg 170 CMD injection molding machine is utilized in this example. The machine is equipped with an 18 mm diameter injection cylinder containing a general purpose screw and non-return valve, a spring loaded shut-off nozzle, and a mold having cavity dimensions of 6.67 cm×6.67 cm×0.69 cm (L×W×D). The mold is fed by a cold sprue and a full thickness film gate (0.76 mm depth). A silicone elastomer having the dimensions of 6.67 cm×6.67 cm×0.48 cm (L×W×D) is inserted into the mold cavity. The silicone elastomer (nominal 85 Shore A hardness) is obtained from Interflex, Inc. (Spartanburg, S.C.), and it is laser engraved with holes having nominal dimensions of 80 micron×300 micron (diameter×depth) in a non-equidistant diamond pattern having an approximate aerial density of 2500 cm$^{-2}$. Relevant processing conditions are shown below. The injection molded articles are de-molded as bi-layer elastomer/polyolefin laminates, and are subsequently manually delaminated, as rapidly as possible, at a 45 degree diagonal. Delamination typically occurs at the right hand side nearest to the gate looking upstream from the sprue. Surface topology and morphology is determined by optical microscopy at the quadrant opposite to initial delamination. A completely solid fringe is observed having the approximate fringe dimensions of 100×265 micron (diameter×length).

| Barrel Temperature (° C.) | |
|---|---|
| Zone 1 | 205 |
| Zone 2 | 230 |
| Zone 3 | 230 |
| Nozzle | 230 |
| Hydraulic Oil Temperature (° C.) | 35 |
| Plasticization Speed (m-min$^{-1}$) | 10 |
| Backpressure (bar) | 25 |
| Dosage (cm$^3$) | 16 |
| Operating Mode | Semi Automatic under Velocity Control |
| Max Available Injection Pressure (bar) | 2500 |
| Fill Time (s) | 0.5 |
| Hold Pressure (bar) | 2500 |
| Hold Time (s) | |
| First Stage | 15 |
| Second Stage | 10 |
| Cooling (zero hold) | 0 |
| Mold Temperature (° C.) | |
| Fixed Platen | 53 |
| Moving Platen | 51 |

The dimensional parameters of the fringe, as determined by optical surface profilometry (using a WYKO NT3300 Optical Profiler and the Vertical Scanning Inteferometry (VSI), are as follows:
Fringe Height (H): 284 microns
Hollow Depth Ratio: 0.33
Hollow Diameter Ratio: 0.035
Hollowness Index: 1.2
Aspect Ratio: 2.0

D) An injection molded plaque is prepared from a blend of two homogeneous, substantially linear ethylene/octene copolymers (67% of a copolymer having an Ml of 30, 0.885 g/cc density and 33% blend of a copolymer having an Ml of 30 and 0.902 g/cc density) by the reciprocating screw injection molding process. An Arburg 170 CMD injection molding machine is utilized in this example. The machine is equipped with an 18 mm diameter injection cylinder containing a general purpose screw and non-return valve, a spring loaded shut-off nozzle, and a mold having cavity dimensions of 6.67 cm×6.67 cm×0.69 cm (L×W×D). The mold is fed by a cold sprue and a full thickness film gate (0.76 mm depth). The mold is fed by a cold sprue and a full thickness film gate (0.71 mm depth). A silicone elastomer having the dimensions of 6.67 cm×6.67 cm×0.48 cm (L×W×D) is inserted into the mold cavity. The silicone elastomer (nominal 85 Shore A hardness) is obtained from Interflex, Inc. (Spartanburg, S.C.), and it is laser engraved with holes having nominal dimensions of 80 micron×300 micron (diameter×depth) in a non-equidistant diamond pattern having an approximate aerial density of 2500 cm$^{-2}$. Relevant processing conditions are shown below. The injection molded articles are de-molded as bi-layer elastomer/polyolefin laminates, and are subsequently manually delaminated, at a slow rate to prevent damaging the sample, at a 45 degree diagonal. Delamination typically occurs at the right hand side nearest to the gate looking upstream from the sprue. Surface topology and morphology is determined by optical microscopy near the center of thew sample. A hollow fringe is observed. Additional hollowness is observed approximately 100 microns below the major surface of the plaque. Process Conditions:

| Process Conditions: | |
|---|---|
| Barrel Temperature (° C.) | |
| Zone 1 | 205 |
| Zone 2 | 232 |
| Zone 3 | 232 |
| Nozzle | 232 |
| Hydraulic Oil Temperature (° C.) | 35 |
| Plasticization Speed (m-min$^{-1}$) | 10 |
| Backpressure (bar) | 10 |
| Dosage (cm$^3$) | 10 |
| Operating Mode | Semi Automatic under Velocity Control |
| Available Injection Pressure (bar) | 2500 |
| Fill Time (s) | 0.5 |
| Hold Pressure (bar) | 2500 |
| Hold Time (s) | |
| First Stage | 6 |
| Second Stage | 0 |
| Cooling (zero hold) | 0 |
| Mold Temperature (° C.) | |
| Fixed Platen | 27 |
| Moving Platen | 25 |

E) An injection molded plaque is prepared from a blend of two homogeneous, substantially linear ethylene/octene copolymers (67% of a copolymer having an Ml of 30, 0.885 g/cc density and 33% blend of a copolymer having an Ml of 30 and 0.902 g/cc density) by the reciprocating screw injection molding process.

An Arburg 170 CMD injection molding machine is utilized in this example. The machine is equipped with an 18 mm diameter injection cylinder containing a general purpose screw and non-return valve, a spring loaded shut-off nozzle, and a mold having cavity dimensions of 5.1 cm×5.1 cm×0.69 cm (L×W×D). The mold is fed by a cold sprue and a full thickness film gate (0.71 mm depth). The viton elastomer (nominal 85 Shore A hardness) is obtained from Interflex, Inc. (Spartanburg, S.C.), and it is laser engraved with holes having nominal dimensions of 110 micron×300 micron (diameter×depth) in a diamond pattern having an approximate aerial density of 2645 $cm^{-2}$, and center to center to center distance between cavities of either 204 microns (shortest distance) or 286 microns (furthest distance along diagonal). Relevant processing conditions are shown in Table 1. The injection molded articles are de-molded as bi-layer elastomer/polyolefin laminates, and are subsequently manually delaminated, at a slow rate to prevent damaging the sample, at a 45 degree diagonal. Delamination typically occurred at the right hand side nearest to the gate looking upstream from the sprue. A substantially solid thumb shaped fringe is observed. Conditions

| Conditions | |
|---|---|
| Barrel Temperature (° C.) | |
| Zone 1 | 205 |
| Zone 2 | 232 |
| Zone 3 | 231 |
| Nozzle | 233 |
| Hydraulic Oil Temperature (° C.) | 35 |
| Plasticization Speed (m-min$^{-1}$) | 10 |
| Backpressure (bar) | 10 |
| Dosage (cm$^3$) | 14 |
| Operating Mode | Semi Automatic under Velocity Control |
| Available Injection Pressure (bar) | 2500 |
| Fill Time (s) | 0.5 |
| Hold Pressure (bar) | 2500 |
| Hold Time (s) | |
| First Stage | 6 |
| Second Stage | 0 |
| Cooling (zero hold) | 0 |
| Mold Temperature (° C.) | |
| Fixed Platen | 27 |
| Moving Platen | 25 |

What is claimed is:

1. A profile or molding comprising at least one layer that displays a surface microstructure, which layer is a thermoplastic polymeric material and covered by fringes, wherein the fringes have a height of at least about 40 microns or more and which are at least partially hollow with at least about 25 percent of the volume at the top of the fringes being empty.

2. A profile or molding according to claim 1, wherein the fringes have a height in the range of from 40 microns to 1 millimeter.

3. A profile or molding according to claim 1, wherein the fringes have a hollow diameter ratio, which is ratio of the diameter of the hollow center at half height and the diameter at the bottom of the fringe, of 1 or lower, as determined by optical surface profilometry.

4. A profile or molding according to claim 1, wherein the fringes have a Hollowness Index of 100 or lower, as determined by optical surface profilometry.

5. The profile or molding according to claim 1, wherein the fringes have an aspect ratio, which is the ratio of the fringe height and the fringe diameter, of at least 1.

6. The profile or molding according to claim 1, wherein the thermoplastic material is cured, irradiated or crosslinked.

7. The profile or molding according to claim 1, wherein the surface microstructure covers all or part of the surfaces or surface.

8. The profile or molding according to claim 1, which is a mono layer profile or molding.

9. The profile or molding according to claim 1, which is a multi layer profile or molding.

10. The profile or molding according to claim 9, wherein at least one of the layers is a foamed layer.

11. The profile or molding according to claim 1, wherein at least one layer is elastic.

12. The profile or molding according to claim 1 which is printed or imprinted.

13. The profile or molding according to claim 1 wherein the surface microstructure has been subjected to a post treatment step selected from the group consisting of treatment with an abrading device, corona treatment, curing, irradiation and crosslinking.

14. A composite comprising a profile or a molding which comprises at least one layer that displays a surface microstructure, which layer is a thermoplastic polymeric material and covered by fringes having a height of at least about 40 microns or more and which are at least partially hollow with at least about 25 percent of the volume at the top of the fringes being empty.

15. An article of manufacture comprising a profile or molding which comprises at least one layer that displays a surface microstructure, which layer is a thermoplastic polymeric material and covered by fringes having a height of at least about 40 microns or more and which are at least partially hollow with at least about 25 percent of the volume at the top of the fringes being empty.

16. The article of manufacture according to claim 15, which is a glove.

17. The article of manufacture according to claim 15 which has a soft touch.

18. The article of manufacture according to claim 15 which is water repellant.

19. The article of manufacture according to claim 15 which has anti-skid properties.

20. The article of manufacture according to claim 15 which has enhanced carrying, capturing or storing properties.

21. The article of manufacture according to claim 15 which is heat resistant.

* * * * *